US010737950B2

(12) United States Patent
Bennett et al.

(10) Patent No.: US 10,737,950 B2
(45) Date of Patent: Aug. 11, 2020

(54) METHODS FOR FILTERING EFFLUENT WATER FOR RECYCLED USE

(71) Applicants: Tyler Bennett, Lemoore, CA (US); Adam Sabourin, Lemoore, CA (US)

(72) Inventors: Tyler Bennett, Lemoore, CA (US); Adam Sabourin, Lemoore, CA (US)

( * ) Notice: Subject to any disclaimer, the term of this patent is extended or adjusted under 35 U.S.C. 154(b) by 58 days.

(21) Appl. No.: 15/688,896

(22) Filed: Aug. 29, 2017

(65) Prior Publication Data

US 2019/0062178 A1 Feb. 28, 2019

(51) Int. Cl.
| | |
|---|---|
| *C02F 1/00* | (2006.01) |
| *B01D 29/56* | (2006.01) |
| *B01D 29/60* | (2006.01) |
| *B01D 29/66* | (2006.01) |
| *B01D 29/90* | (2006.01) |
| *B01D 35/02* | (2006.01) |
| *B01D 29/11* | (2006.01) |
| *B01D 29/23* | (2006.01) |
| *B01D 29/68* | (2006.01) |

(Continued)

(52) U.S. Cl.
CPC ............. *C02F 1/008* (2013.01); *B01D 29/11* (2013.01); *B01D 29/23* (2013.01); *B01D 29/56* (2013.01); *B01D 29/606* (2013.01); *B01D 29/668* (2013.01); *B01D 29/682* (2013.01); *B01D 29/688* (2013.01); *B01D 29/902* (2013.01); *B01D 35/02* (2013.01); *C02F 1/004* (2013.01); *A01G 25/165* (2013.01); *B01D 2201/16* (2013.01); *B01D 2201/583* (2013.01); *C02F 1/50* (2013.01); *C02F 1/66* (2013.01); *C02F 2103/20* (2013.01); *C02F 2201/005* (2013.01); *C02F 2209/005* (2013.01); *C02F 2209/03* (2013.01); *C02F 2209/06* (2013.01); *C02F 2303/04* (2013.01); *C02F 2303/16* (2013.01); *C02F 2303/24* (2013.01); *E03B 7/074* (2013.01)

(58) Field of Classification Search
CPC .... B01D 2201/16; B01D 29/11; B01D 29/56; B01D 29/606; B01D 29/668; B01D 29/902; B01D 35/02; C02F 1/004; C02F 1/008; C02F 1/50; C02F 1/66; C02F 2201/005; C02F 2209/005; C02F 2209/03; C02F 2303/04; C02F 2303/16; E03B 7/074
See application file for complete search history.

(56) References Cited

U.S. PATENT DOCUMENTS

| | | |
|---|---|---|
| 1,338,999 A | 5/1920 | Peck |
| 4,017,394 A | 4/1977 | Hensley |
| | (Continued) | |

OTHER PUBLICATIONS

VACLEEN 5000 Series Ag Filter—Product Information— published at least as early as Aug. 28, 2017.

*Primary Examiner* — Terry K Cecil
(74) *Attorney, Agent, or Firm* — William K. Nelson; Mark D. Miller

(57) ABSTRACT

The present invention provides an improved filtering system and method for filtering effluent water for use in irrigation and other applications. The improved filtering system offers significant advancements to the flow rate, efficiency, and reliability of effluent water filtration. The present invention provides systems and methods for filtering of effluent water with a multi-staged filter system, which are self-cleaning, requiring less down time and nearly continuous filtration function.

36 Claims, 7 Drawing Sheets

(51) Int. Cl.
*A01G 25/16* (2006.01)
*C02F 1/66* (2006.01)
*C02F 1/50* (2006.01)
*C02F 103/20* (2006.01)
*E03B 7/07* (2006.01)

(56) References Cited

U.S. PATENT DOCUMENTS

| | | |
|---|---|---|
| 4,529,518 A | 7/1985 | Jackson |
| 4,768,712 A * | 9/1988 | Terrell ................ A01C 23/042 |
| | | 137/624.12 |
| 5,049,263 A * | 9/1991 | Hoffman ................ B01D 29/27 |
| | | 210/452 |
| 5,192,429 A | 3/1993 | Bader |
| 5,403,498 A * | 4/1995 | Morrissey ................ E03B 1/04 |
| | | 210/767 |
| 5,433,849 A | 7/1995 | Zittel |
| 5,667,670 A | 9/1997 | Drewery |
| 5,770,071 A | 6/1998 | Drewery |
| 6,334,958 B1 | 1/2002 | Ruskin |
| 6,719,900 B2 * | 4/2004 | Hawkins .............. B01D 29/118 |
| | | 210/248 |
| 6,959,818 B2 | 11/2005 | Olson |
| 7,347,933 B2 | 3/2008 | Berry et al. |
| 8,028,841 B2 | 10/2011 | Olson |
| 2005/0023196 A1 * | 2/2005 | Ku ........................ B01D 35/02 |
| | | 210/90 |
| 2005/0178708 A1 * | 8/2005 | Mark ..................... C02F 9/005 |
| | | 210/138 |
| 2009/0242492 A1 | 10/2009 | Ruskin |

* cited by examiner

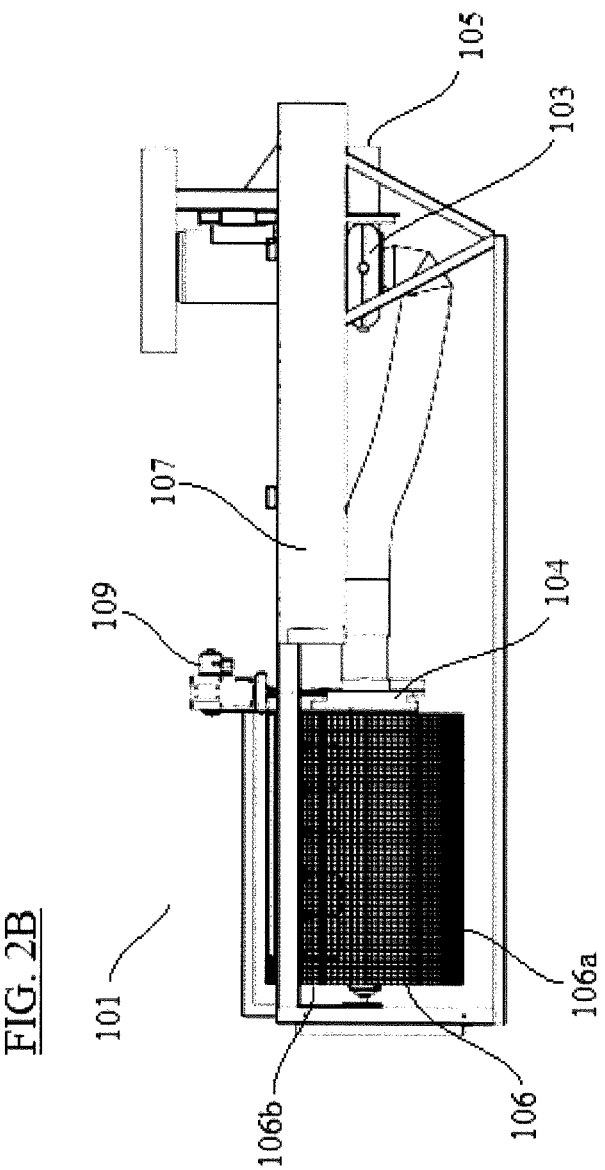

METHODS FOR FILTERING EFFLUENT WATER FOR RECYCLED USE

FIELD OF THE INVENTION

The present invention relates to a method for filtering water for recycled use, and specifically to filtering effluent water from agricultural operations for use in irrigation.

DISCUSSION OF THE BACKGROUND

Drip Irrigation systems have quickly become an industry standard for the irrigation of tree, row, and forage crops in arid environments. The controlled and precise application of water and injected nutrients via drip systems=has led to higher yields for growers. Water and energy savings are also realized with drip irrigation systems.

Livestock and dairy operations have lagged behind other agricultural operations in developing and adopting new water recycling techniques. Livestock feed lots and dairy farms use water for multiple applications and reuse the water in several different ways, including drinking water for the animals, misters and other climate control systems, refrigeration systems, and lane flushing systems. After these operations use water, it is drained to on-site settling ponds to allow particulate matter to settle out of the waste water to reduce the amount of solids and reduce the organic matter in the waste water. As water shortages and the drought continue to worsen, it has become important for farmers to recycle and reuse effluent water. Water collected in settling ponds offers a resource for ag operations such as dairies and feedlots if filtering innovations are employed to reclaim the effluent.

Conventional effluent water filtration systems mix effluent water with fresh well water, and pressurize the mixture into a battery of sand media filter tanks, thereby filtering the blend in a single stage. This process has low flow rates and low volumes of effluent recapture. Further, such sand media filter tanks must be back-flushed frequently, causing lost filtering time, and correspondingly, less filtered water production. Overall, existing effluent water filtering technology is slow, inefficient, expensive, and requires frequent cleaning cycles during which effluent water cannot be filtered. Because of these inefficiencies, many agricultural operations have not adopted effluent filtration and continue to use wasteful water use practices.

Therefore, improved and efficient effluent recycling technologies are needed.

SUMMARY OF THE INVENTION

The present invention provides an improved filtering system and method for filtering effluent water for use in irrigation and other applications. The improved filtering system offers significant advancements to the flow rate, efficiency, and reliability of effluent water filtration. The present invention provides systems and methods for filtering of effluent water in a multi-staged manner, with a high efficiency and flow rate, which does not require frequent down time and provides nutrient rich water which can pass through a drip irrigation system.

Effluent water in farming and dairy operations is commonly collected in a series of settling ponds, with the last settling pond typically having the least volume of solids remaining in the water. The present invention includes an effluent filtering system operable to remove sufficient solid and particulate matter to allow the produced filtrate to be used for irrigation purposes, for animal watering purposes, and other applications. In the case of irrigation, some of the very small particulates and dissolved nutrients in the effluent may be retained in the filtrate to provide nutrients for the plants and crops to which the filtrate is delivered. In the case of animal watering, more filtration stages and finer filters may be required to provide water of sufficient purity. The invention provides a system and process for effective water recycling in agricultural settings, but may be effectively applied in other contexts in which there is need to remove particulate matter from fouled water, such as sewage water reclamation projects, etc.

The effluent may be collected from a settling pond or other source of fouled water, by an intake system (e.g., a centrifugal pump buoyed by a stable flotation device) having a filtering screen to filter out coarse particulates and solids in a first filtration stage. The filtering screen may have a mesh rating in a range of about 10 mesh to about 40 mesh. The intake system may be operable to float on the surface of a wastewater pond, draw effluent water through filtering screen, and create water pressure sufficient to convey the effluent water from an intake pump, through an intake pipeline, through the plurality of filter devices, through an output pipeline, and out to one or more emission devices. The rough filtrate may be passed through a plurality of self-cleaning filter devices. Each successive filter device may include finer filter elements, providing a staged approach to the removal of the solids from the effluent water. The use of successively finer filter elements may avoid clogging and reduce the number and frequency of cleaning operations required to keep the filter devices properly working.

The self-cleaning filter devices may be operable to flush any entrapped solids by using a series of "vacuum" wands positioned along a central axis of the housing that spin around on the inside of a filter element within the filter device and draw the solids off of the filter element to be flushed from the filter device. The operation of the vacuum wands occurs during a special cleaning operation that may be initiated by an electronic controller when a predetermined condition or set of conditions (e.g., pressure drop across the filter device from inlet to outlet) are detected, and the electronic controller is programmed to initiate the cleaning operation in the event of the predetermined condition or set of conditions. The cleaning operation may be initiated by opening a flush valve that drops the pressure in a flush compartment, thereby causing the effluent to be drawn ("vacuumed") from a filter compartment where filter compartment where a filter element is housed into the vacuum wands, along with debris from the interior of the filter element, and flushed from the filter compartment.

In some embodiments, each filter device may have its own dedicated controller that monitors the upstream and downstream pressure of the filter device. When a predetermined pressure differential is detected (e.g., by pressure sensors in fluid connection with inlet and outlet piping) across the filter from inlet to outlet and the sensor data is communicated to the controller, an electronic command is sent by the controller to open a flush valve for the filter device to initiate a cleaning operation. The cleaning operation may be performed for a sufficient time to return the pressure differential across the filter device to an acceptable predetermined level.

The filtering system may also include a variable frequency drive pump controller that provides the ability to vary amount of effluent pumped from the effluent source, to thereby vary flow rates through the filtering system. The flow rate of the effluent through the system may be controlled by the drive pump controller, which may vary the flow rate of effluent through the system based on one or more of several factors, including pond liquid level, solid concentration level, flush frequency per filter, and predetermined output requirements for a system receiving filtrate from the filtering system (e.g., an irrigation system that provides the filtrate to irrigate crops). The drive pump controller may control the flow rate of effluent through the system by varying the drive pump's motor speed and/or by adjusting an inlet valve in the inlet for the pump to control the volume of water allowed to pass through the drive pump.

In such embodiments, a single integrated controller may monitor the pressure differential across each of the filter devices and be operable to control the flush valves and initiate cleaning operations for each of the filter devices. In such embodiments, the controller may be operable to coordinate the cleaning operations of individual filters. For example, and without limitation, the controller may be programmed to frequently or continuously monitor the pressure differential across each of the filter devices and coordinate cleaning operations of the filter devices such that only one filter device is undergoing a cleaning operation at any given time. The integrated controller may also be operable to control the drive pump and/or inlet valve for the drive pump.

The integrated controller may also be programed to include protocols for maximizing the efficiency of the filtering system. The filtering system may include several sensors at various positions along the system to provide a continuous, real time flow of data to allow the controller to initiate various programmed operations in response to data values provided to the controller from the sensors. The controller may be programmed to compare the data values provided by the sensors to pre-determined values stored in a memory in electronic communication with the integrated controller.

The filtering system may include several pressure sensors for measuring fluid pressure in the filtering system. The pressure sensor elements may be protected from contamination and damage by a diaphragm between the sensor elements and the fluid in the filtration system. The pressure sensors may include a first pressure sensor at or near the intake system that measures the pressure of fluid entering the intake pipe, upstream and downstream pressure sensors at the inlets and outlets of each filter device. These pressure sensors may provide pressure data for each filter device to the controller and allow it to calculate pressure differentials across the filter devices.

The filtering system may include other types of sensors, including water level sensors in the water source, particulate matter sensors in the water source, and sensors for measuring physical and chemical conditions of the filtrate in the outlet pipeline (e.g., sensors for measuring flow rate, pH, salinity, temperature, and other characteristics of the filtrate). These sensors may also be in electronic communication with the integrated controller, and the data provided by the sensors may be analyzed and recorded by the integrated controller. The integrated controller may execute algorithms in response to the data provided by the sensors.

The filtering system may also include several valves that may be electronically controlled and actuated, and that may be in electronic communication with independent controllers or an integrated controller. The filtering system may include a first pressure regulating valve in the inlet pipe, a valve at each inlet and each outlet of the filter devices, a flush valve in fluid communication with the flush compartment of the flush outlet of each filter device, one or more valves in the chemical injection system for releasing chemicals into a filtrate produced by the filter devices, a second pressure regulating valve controlling filtrate flow through the outlet pipe, and valves within one or more emission device(s), to allow the controller to direct the filtrate to one or more emission devices independently and/or in a predetermined pattern. The flush valves may be air-actuated diaphragm valves, which may improve the efficiency and speed of the operation of the cleaning mechanism.

The integrated controller may be in electronic communication with the valves and may control them in accordance with programmed algorithms in response to data provided by the sensors in the filtering system. For example, if one of the filter devices reaches an unacceptably high differential, at which point the controller sends a signal to open the flush valve of the filter device indicated as having an unacceptably high pressure differential to initiate a cleaning operation. In another example, the controller may be programmed with acceptable pH values for the filtrate, and may continuously monitor the pH of the filtrate, until the pH reaches an unacceptable level, at which point the controller sends a signal to open a valve in the chemical injection system to introduce a chemically active solution (e.g., an acid, a base, or buffer) into the filtrate to adjust the pH of the filtrate. The integrated controller may be programmed with a matrix of combinations of data points, with the required action to take by the integrated controller in response to the combination of data points. For example, the amount of chemically active solution (e.g., acid, base, or buffer) may be determined by comparing a combination of flow rate (e.g., measured by a flow sensor) and pH (e.g., measured by a pH sensor) to a matrix of values stored in the controller's memory to determine the proper volume of chemically active solution to introduce into the filtrate to bring the pH into the predetermined range of acceptable values.

In some embodiments, the controller may regulate the activity of the drive pump to adjust the volume and rate of irrigation water needed for one or more crop fields irrigated by the filtrate. In some implementations, the controller may be programed to irrigate a single field at a particular time or times in a 24-hour period. In other implementations, the controller may be programed to irrigate multiple fields at different times, and the fields may have different filtrate volumes and flow rate requirements. The integrated controller in such implementations may cycle between irrigation sessions for each of the multiple fields and control the operation of the drive pump to adjust the volume and rate of effluent pumped into the filtration system as the integrated controller switches between irrigation sessions for separate fields. In such implementations, the filtering system may include a manifold connected to allocation conduits feeding each of the multiple fields, with the flow of filtrate to each allocation conduit being controlled by an emission valve. The emission valves may be in electronic communication with the integrated controller and the integrated controller may control the opening and closing of the emission valves, opening them according to an irrigation schedule or algorithm (e.g., the controller may provide a first volume of filtrate to a first field at a pre-determined rate, the controller may subsequently provide a second volume of filtrate to a second field at a second pre-determined rate, and so on). The rate of flow may also be adjusted by the integrated controller based on the rate of filtrate produced. For example, the second pressure regulating valve may be partially closed when a cleaning operation is initiated in a filter device to accommodate a reduction in filtration rate and raise the pressure in the filter devices.

In some embodiments, the controller operation may be coordinated with other systems to increase efficiencies of a broader operation (e.g., of a dairy, farm, or ranch). For example, the controller may be in electronic communication with a solar energy source and the controller may be programed to wait until the power available to the filtering system rises above a certain level before the controller sends a signal to drive pump to initiate and pump water through the filtering system.

The filtering system may further include a chemical monitoring and injection system. The chemical monitoring and injection system may monitor chemical levels and inject measured amounts of chemicals into the filtrate to regulate the level of one or more chemical conditions according to a pre-determined level or range of acceptable levels. For example, the chemical monitoring and injection system may regulate the pH level of the filtrate that is introduced into an emission device (e.g., irrigation system). The chemical monitoring and injection system may include a pH sensor that is in electronic communication with the integrated controller, which monitors the pH data from the pH sensor and compares it to a pre-determined value or range of values stored in a memory of the controller (e.g., pH in a range of about 5 to about 7.5, or any value or range of values therein). The chemical monitoring and injection system may also include an acid/base injection assembly, which may include one or more reservoirs for storing chemicals and an injection apparatus in fluid communication with the one or more reservoirs. The injection mechanism may be electronically controlled and be in electronic communication with the integrated controller. If the pH sensor data provided to the controller is outside the pre-determined value or range of values, the integrated controller will send a signal to the injection mechanism to add a volume of the chemical sufficient to adjust the pH to a desired level in the filtrate. In some examples, the controller receives pH data from the pH sensor in the filtrate leaving the last filter device and inject an acid solution (e.g., a solution of sulfuric acid [$H_2SO_4$], phosphoric acid [$H_3PO_4$], nitric acid [$H_2NO_3$], citric acid [$H_3C_6H_5O_7$], and combinations thereof) into the filtrate at a varying rate to maintain filtrate at a target pH to prevent biological growth/accumulation in the irrigation system and the emission device(s). Other beneficial additives may be added into the filtrate as well, such as fertilizers, herbicides, pesticides, etc.

The filtering system of the present invention is operable to filter effluent wastewater and deliver it to a crop field without frequent downtime to backflush the plurality of filters, allowing an owner to repurpose nutrient rich wastewater and take advantage of a highly efficient drip irrigation system. The elements of the filtering system are described individually below. The filtering system may include an intake pump with a self-cleaning mesh filter at an effluent water source (e.g., a floating centrifugal pump that has a rotating screen protecting the intake of the volute), a plurality of filter devices arranged in sequence with progressively finer filter elements, each with an independently controlled flush valve, an intake pipeline from the intake pump to first filter device of the plurality of filter devices with a first pressure regulating valve, interconnecting pipes between the filter devices having pressure sensors therein, an outlet pipeline from the plurality of filter devices to the emission device, which may include a second pressure regulating valve and a pressure sensor, a chemical monitoring and injection system, and an emission device for feeding filtered effluent water to a recycled use application (e.g., drip irrigation in a crop field).

Intake System

The intake system may include a flotation structure that can float on the surface of a water source, an intake pump, and a filtration mechanism. In some embodiments, the intake pump may be operable to create water pressure sufficient to draw effluent water from the water source and direct it through the intake pipeline, the plurality of filter devices, the outlet pipeline, and the emission device.

The filter mechanism may be operable to filter coarse organic solids and other debris from effluent water pumped through the filtration member by the intake pump. The filter mechanism may be a perforated screen or mesh having a mesh size in a range of about 10 mesh (2 mm) to about 45 mesh (0.354 mm), or any value or range of values therein, where the mesh size is sufficient to prevent the passage of solids large enough to clog the intake pump. The filter mechanism may be in fluid communication with the intake pump and the intake pipeline, such that pressure generated by the intake pump draws effluent water through the filter mechanism and into the intake pipe.

The flotation structure may include one or more flotation devices, such as pontoons, buoys, or other flotation devices mechanically connected to a housing or frame. The floating structure may be capable of buoying the weight of the intake pump, the filtration system, and at least one maintenance person above the water. A floating base may include a platform with flotation devices for maintaining the intake pump in position such that it has a submerged portion through which effluent is drawn and an above-water portion. The intake pump may be attached to the housing or frame in a partially submerged manner. For example, the intake system may be a floating suction strainer system, which includes a centrifugal pump and a rotating strainer screen through which water is drawn, and in some examples may include a self-cleaning system (e.g., a Riverscreen™ brand pump system). The rotating strainer screen may be rotatably mounted on a frame that may be mechanically connected to one or more flotation devices such that a portion of the strainer screen remains submerged while it rotates. The filter screen may constantly rotate about its horizontal central axis such that the submerged portion of the outer screen is constantly cycling.

The intake system may include a self-cleaning mechanism for the filter screen, comprising spray nozzles that are directed at the mesh or perforations in the screen such that they dislodge debris from the strainer screen. The nozzles may be in fluid communication with either a secondary pump or the outlet of the intake pump to supply the nozzles with pressurized water. The nozzles may be directed at the outer surface of the filter screen and may spray water through the above-water portion of the outer screen as it rotates, such that solids filtered from the water source and lodged in the filter screen are blown off of the filter screen.

In other embodiments the intake pump may be in fluid communication with a floating strainer having a buoyant housing and one or more filter screens that are statically connected to the housing and sit below the water when the housing is placed in a water source. The water may be drawn through filter screens by the intake pump into the inlet pipe. In such embodiments, the flotation mechanism may be incorporated into a housing made from a buoyant material or combination of materials, such as a housing made from a non-corrodible material (e.g., a polymer or plastic housing) having an watertight float chamber therein or a low density material therein (e.g., a low-density polymer foam, e.g., Styrofoam) for reducing the density of the housing. Other appropriate intake pump systems are contemplated within the scope of the invention.

The intake pump may be operable to create pressure to draw water from the water source through the outer screen. The intake pump may include an electrical or gas-operated pump, an intake, and an outlet. In embodiments where the motor is electrical, the electric motor may be in electrical communication with the variable frequency drive controller, which may vary the flow rate generated by the pump by varying the electrical current supplied to the drive pump. In some embodiments, the variable frequency drive controller may be operable to receive a signal from a water pressure sensor upstream of the first filter device and vary the speed of the drive pump to increase or decrease water pressure to meet a target pressure based on the signal.

In some embodiments, the pump power source and the variable frequency drive controller may be integrated into an integrated controller, which may monitor the pressure in the intake pipe and/or the outlet pipes and send an electronic signal to the variable frequency drive controller to adjust the pump speed to meet a target pressure based on the pressure measured by the sensors. The target pressure may vary with the application of the filtrate. For example, the target pressure may differ between a protocol for watering a first field and a protocol for watering a second field.

Intake Pipeline

The intake pipeline may include a watertight pathway in fluid communication with the intake pump and a water intake of a first filter device of the plurality of sequential filter devices. In some embodiments, the intake pipeline may be made of PVC, metal, high-density polyethylene, acrylonitrile-butadiene-styrene, other appropriate materials, or combinations thereof. In some embodiments, the intake pipeline may have an inner diameter sufficient to provide adequate water flow for supplying irrigation water to a crop field, which may be in a range from about 4 inches to about 16 inches (e.g., from 8 inches to about 12 inches, or any other value or range of values therein).

In some embodiments, the intake pipeline may include a first pressure regulating valve for controlling the flow rate of effluent water through the intake pipeline. The first pressure regulating valve may include a butterfly valve, a diaphragm valve, a globe valve, a gate valve, or other appropriate valve mechanisms. The occlusion of the intake pipe by the first pressure regulating valve may be adjusted to take into account one or more of the level of the effluent water source, the concentration of organic solids and other debris in the effluent water, the frequency of cleaning cycles of the plurality of filter devices, and/or the volume of water required at the emission device to sufficiently water the crop field. In some embodiments, the first pressure regulating valve may include an electronically controlled actuator for adjusting the position of the first pressure regulating valve that is in electronic communication with an integrated controller operable to adjust the position of the first pressure regulating valve based on a signal from the integrated controller. In other embodiments, the first pressure regulating valve may include a handle and may be manually adjustable.

The intake pipeline may have at least one air release vent to allow air to escape as the intake pipeline fills with water, and to allow air to enter the intake pipeline as water pressure drops in the intake pipeline, preventing debris from backfilling into the intake pump. The at least one air release vent may include an opening and a float valve, the float valve being operable to close the opening by being raised by water entering the air release vent. The intake pipeline may have a plurality of air release vents advantageously positioned along the intake pipeline at locations likely to require the release of air pockets.

Filter Devices

Embodiments of the filtering system of the present invention may include a plurality of filter devices (e.g., 2 to 10 filter devices) that are sequentially connected. In some embodiments, the plurality of filter devices may include a first filter device, a second filter device, and a third filter device. The filter devices may be connected in sequence by connecting pipes running between them. The water inlet of the first filter device may be in fluid communication with the intake pipeline, and may have an inner diameter substantially equal to an inner diameter of the intake pipeline. The water outlet of the first filter device may be in fluid communication with the water inlet of a second filter device via a first interconnecting pipe, and the water outlet of the second filter device may be in fluid communication with the water inlet of the third filter device via a second interconnecting pipe, and so on. In some embodiments, each of the water inlets and each of the water outlets of each of the filter devices may have a substantially equal inner diameter. In some embodiments, the water outlet of the final filter device may have an inner diameter substantially equal to an inner diameter of the outlet pipeline.

Each of the filter device may include a housing, a filter element, a water intake, a water outlet, a flush outlet, a flush valve, and a cleaning mechanism. The filter devices may each have a housing having a substantially cylindrical shape with an internal bulkhead separating a filter compartment and a flush compartment. The separation between the filter compartment and flush compartment may be watertight. In some embodiments, the filter compartment may encompass the filter element, and may include the water intake and the water outlet, and the flush compartment may encompass the flush outlet. In some embodiments, the water outlet of the housing may include an outlet valve, the outlet valve capable of controlling the flow of water through the water outlet. In some embodiments, the outlet valve may include at least one of a diaphragm valve, a globe valve, a gate valve, or the like.

The filter element of each filter device may include a screen filter with a substantially cylindrically shape positioned to filter effluent water flowing from the water inlet to the water outlet. The filter element may include any suitable material for withstanding the water pressure and corrosive effects of the effluent water passing through the filter device (e.g., stainless steel, copper, or the like). The filter elements of the present invention may have mesh ratings that vary from the first filter device to the final filter device in a range between about 45 mesh to about 500 mesh (e.g., in a range of about 60 mesh to about 300 mesh, or any range of values therein). For example, and without limitation, the first filter device may have a 60 mesh filter and the successive filter devices may have progressively higher mesh ratings, with the final filter device having a mesh rating sufficient to filter out organic solids and debris capable of clogging the emission device (e.g., a mesh rating in a range of about of 120 to about 200).

Each of the filter devices may include a cleaning mechanism for removing accumulated debris from the interior of the filter element. The cleaning mechanism may include a central axle having an internal channel running therethrough. The central axle may traverse the bulkhead through a water-tight passage, and the internal channel of the central axle may be in fluid communication with one or more vacuum wands that radiate from the central axle within the filter compartment, and a plurality of water rotor arms that radiate from the central axle within the flush compartment of the housing. The one or more vacuum wands may have distal vacuum nozzles that are in close proximity to the internal surface of the filter element, and the opening of the vacuum nozzle may be directed at the surface of the filter element. The vacuum nozzles may draw effluent water and debris from the inner surface of the filter element during a cleaning operation. The rotor arms are components of a water driven motor mechanism for driving the movement of the vacuum wands along the internal surface of the filter element during a cleaning operation. In some embodiments, the cleaning mechanism may further include a plurality of fins that radiate from the central axle in the filter compartment. The plurality of fins may regulate the speed of rotation of the vacuum wands during a cleaning operation.

The cleaning mechanism may be activated by opening a flush valve that controls the movement of fluid through the flush outlet. The flush outlet is in fluid communication with the flush compartment on the opposite side of the bulkhead from the filter compartment. The flush outlet may be opened and closed by a flush valve controlled by an independent flush controller specific to the filter device, and in other embodiments by an integrated controller. Each filter device of the plurality of filter devices may include a flush valve for controlling the flow of effluent and debris through the flush outlet. Embodiments of the flush valve may include at least one of a diaphragm valve, a globe valve, a gate valve, and the like. In some implementations, the flush valve may be an air actuated diaphragm valve to improve the efficiency and speed of the operation of the cleaning mechanism, and to prevent contamination of the valve mechanism.

Under normal operating conditions, the flush outlet is closed allowing the pressure of the effluent water to pass a filtrate through the filter element into the outer collection chamber in the filter compartment and into the outlet. A cleaning operation initiated when upstream and downstream pressure sensor readings differ by a pre-determined amount, such as a pressure differential in of about 1 PSI to about 10 PSI (e.g., in the range of about 3 PSI to about 7 PSI, or any value or range of values therein).

During a cleaning operation, the flush valve may be opened by the flush controller (e.g., via an electronic signal) when the independent flush controller or integrate controller senses that the pre-determined pressure differential has been reached. When the outlet valve is opened, the pressure in the flush compartment drops due to the opening of the flush valve and effluent water is allowed to flow from the interior side of the filter element in the filter compartment into the distal holes in the vacuum wands. Effluent water flows through the vacuum wands to internal channel of the central axle and then through the central axle across the bulkhead and into the rotor arms within the flush compartment. The effluent water exits through the rotor arms through a narrow nozzle at the distal end of each rotor arm, each distal end being curved in a circumferential direction that is parallel or substantially parallel to the curved inner surface of the cylindrical outer wall of the flush compartment. The jets of effluent passing out of the distal nozzles cause the central axle of the cleaning mechanism to rotate in the opposite direction of the expelled water. As the central axle rotates, the plurality of vacuum wands rotate as well, and the vacuum nozzles pass along the internal surface of the filter element and draw debris off of the filter element and into the vacuum nozzles. The debris then passes through the vacuum wands, into the internal channel of the central axle, and is then expelled through the distal nozzles of the jet arms into the flush chamber. The debris and effluent water are subsequently flushed through the flush outlet.

To ensure that all or substantially all of the interior of the filter element is cleaned during a cleaning operation, the cleaning mechanism may include an oscillating linkage that is operable to move the central axle along the lengthwise axis of the filter device as the rotor arms propel rotation of the central axle during the cleaning operation. This oscillating linkage may be isolated within the filter chamber to prevent contamination with effluent water and debris. The oscillating linkage may include a track follower (e.g., a pin, a tooth, a pawl, etc.) positioned on the interior wall of the central axle at an end of the central axle and a helical bi-directional track positioned on a stationary cylindrical track bar that is coaxial with the central axle and nests within the central axle. The helical track may include grooves in a helical pattern, and the grooves may have a cross sectional shape that is complementary to the shape of the track follower, which may cooperatively engage with the grooves of the helical track. In some embodiments, the helical track may include a reversing loop at both ends such that the helical track reverses direction and forms bi-directional closed circuit for the track follower to follow. The track follower may follow the helical path around the circumference of the cylindrical track bar as the rotor arms drive the rotation of the central axle during a cleaning operation. The angled helical path guides the track follower both around the circumference of the cylindrical track bar and along the length of the cylindrical track bar such that the central axle both rotates around its axis and oscillates back and forth along its axis. The plurality of vacuum rotors may be positioned along the central axle such that the sum of the helical paths followed by the vacuum wands covers and cleans the entire internal surface of the filter element.

The arrangement of the cylindrical track bar and the track follower may vary in different embodiments. In some embodiments, and without limitation, the track follower may be located in an opposite end of the central axle from the rotor arms and the cylindrical track bar may be nested within the same end. The cylindrical track bar may be positioned in a water-tight housing and the end of the central axle that may be sealed off from the portion of the central axle that is in fluid communication with the vacuum wands and the rotor arms, such that no effluent water or debris contaminates the oscillating linkage. In other embodiments, the cylindrical track bar may be positioned with in a water-tight housing within the flush compartment and the track follower may be located in the end of the central axel adjacent to the rotor arms. The end of the central axle that includes the track follower may be sealed off from the portion of the internal channel that passes effluent from the filter chamber, and the cylindrical track bar may be nested therein.

In further embodiments, the lengthwise movement of the central axle may be driven by other mechanisms, such as a separate linear motor that moves the central axle back and forth along the length of the filter device during a cleaning operation. The central axle may be rotatably engaged with a bearing that moves along the axis of the filter device with the movement of a linear actuator of the linear motor. In still further embodiments, the lengthwise movement of the central axle may be driven by a ball screw actuator system. The central axle may be rotatably engaged with a bearing that moves along the axis of the filter device with the movement of the ball nut along screw as the screw rotates. The direction of ball nut movement may be reversed by reversing rotation of the screw. In such embodiments, it is understood that the actuation mechanism may be isolated in a water-tight housing. The integrated controller may be in electronic communication with the linear motor of the ball screw actuator and may be operable to coordinate the flush valve operation and the oscillation of the ball screw. In such embodiments, the linear actuators may be in electronic communication with the integrated controller and the activation of the linear actuators may be controlled by the integrated controller.

In some embodiments, the housing may have at least one air release vent to allow air to escape as the housing fills with water, and to allow air to enter the housing as water pressure drops in the intake pipeline. The at least one air release vent may include an opening and a float valve, the float valve being operable to close the opening by being raised by water entering the air release vent. The housing may include a plurality of air release vents advantageously positioned on the housing to release air from different internal compartments of the housing.

In some embodiments, each of the filter devices may be a commercially available filter device such as an Olson Vaclean brand filter device, as described in U.S. Pat. No. 8,028,841 B2, which is incorporated herein in its entirety.

Controller

Each filter device may have a corresponding, independent flush controller that is provided for monitoring the water pressure at the water inlet and the water outlet, and controlling the flush valve of the filter device. When a predetermined pressure differential is detected (e.g., by pressure sensors in fluid connection with inlet and outlet piping) across the filter from inlet to outlet and the sensor data is communicated to the controller, a command may be sent by the controller to open the flush valve for the filter device to initiate a cleaning operation. The controller may be programmed to initiate the cleaning operation in the event of the pressure differential meeting a pre-determined condition. The electronic controller may send an electronic signal to a flush valve actuator that opens the flush valve in response to the signal. The flush valve may be a quick-acting air actuated valve. When the flush valve is opened, the pressure in a flush compartment drops as fluid is allowed to flow of the flush compartment and into the flush outlet, which in turn draws fluid from the filter compartment into the flush compartment as the pressure drops in the flush compartment. The cleaning operation may performed for a sufficient time to return the pressure differential across the filter device to an acceptable predetermined level.

In some embodiments, the independent flush controller may include a user interface for programming the flush controller, and a central processing unit (CPU) in electronic communication with water pressure sensors positioned to measure the pressure at the water inlet and at the water outlet of the filter device with which the independent flush controller is associated (each filter device may be associated with a separate independent flush controller. The CPU may be operable to receive signals from the water pressure sensors located at the inlet and the outlet of the filter device, and compare the water pressure at the water inlet and the water outlet. The independent flush controller may be operable to open the flush valve when the difference between the water pressure at the water inlet and the water outlet reaches a threshold value. In some embodiments, the independent flush controller may be operable to close the flush valve after a predetermined time (e.g., from about 30 seconds to about 5 minutes). In other embodiments, the independent flush controller may be operable to close the flush valve after the difference between the inlet pressure and the outlet pressure reaches a pre-determined threshold value in a range of about 1 PSI to about 10 PSI (e.g., less than about 7 PSI, less than about 5 PSI, or any value therein).

In some embodiments, the independent flush controller may further be operable to control an outlet valve at the outlet of the filter device. In some embodiments, when the difference between the pressure at the water inlet and the water outlet fails to reach the preferred value after the flush valve has been open for a predetermined time (e.g., from 10 seconds to 2 minutes), the independent flush controller may be operable to close the outlet valve. By closing the outlet valve while the flush valve is opened, extra water pressure may be created at the vacuum nozzles of the cleaning mechanism, and the volume of water being vacuumed as the vacuum nozzles pass along the inner internal surface of the filter element may be increased. The flushing of organic solids and debris from the inner surface of the filter element may thus be enhanced. In some embodiments, the flush controller may be operable to re-open the outlet valve after a predetermined time (e.g., from 10 seconds to 2 minutes).

In other embodiments, the filtering system may have an integrated flush controller that is operable to monitor the water pressure at the water inlet and water outlet of each filter device and control the flush valves of each and all of the filter devices in a coordinated manner. The integrated controller may include a central processing unit (CPU) in electronic communication with the various sensors in the filtering system (e.g., water pressure sensors, flow rate sensors, chemical sensors, etc.) and the electronic actuators for opening and closing valves in the system (e.g., inlet and outlet valves, flush valves, etc.), a user interface for programing the integrated controller, and a power source. The integrated flush controller may thus be operable to receive a signal from pressure sensors positioned to monitor the water pressure at one or more of the water inlet of the first filter device, the water outlet of the final filter device, and at connecting pipes in between each of the filter devices. The integrated controller may compare water pressure at the water inlet and the water outlet of each of the filter devices and calculate pressure differential data. The integrated controller may then compare the differential pressure data to a pre-determined threshold value stored in a memory of the integrated controller. When a pressure differential across a filter device reaches a pre-determined threshold value (in a range about 1 PSI to about 10 PSI, e.g., about 4 PSI to about 6 PSI), the integrated controller may send a signal to the flush valve of the filter device to open and initiate a cleaning operation for the filter device.

The integrated controller may be operable to subsequently end the cleaning operation by sending a signal to the close the flush valve based on one or more pre-determined parameters. In some embodiments, the integrated controller may end a cleaning operation after a predetermined time, e.g., after about 30 seconds to about 5 minutes, or any value therein. In some embodiments, the predetermined flush period may be a set period for all cleaning operations of all filter devices. In other embodiments, the pre-determined period for the cleaning operation may vary based on the particular filter element of the particular filter device. As previously discussed, the mesh rating of the filter elements of the filter devices may increase progressively from one filter device to the next (the mesh holes in an upstream filter device are larger than the mesh holes in a downstream filter device). Due to the differing mesh ratings, the cleaning operation time required to remove all or a sufficient majority of the debris in the filter element to return the filter devices to the pre-determined pressure differential threshold may differ. Thus, the integrated controller may be programmed to apply different cleaning operation periods to the different filter devices. For example, the first filter device may have the coarsest filter element (e.g., a mesh rating in a range of about 45 mesh to about 80 mesh) and may thus have the shortest cleaning period (e.g., a period in a range of about 20 secs. to about 60 secs.) because the debris is easier to dislodge from the larger holes in the filter element. The cleaning operations for each successive filter may be progressively longer—a second filter device having a filter element with a mesh rating in a range of about 60 mesh to about 100 mesh may have a cleaning period in a range of about 40 secs. to about 90 secs., and the final filter device may have the finest filter element with a mesh rating in a range of about 100 mesh to about 200 mesh (e.g., about 120 mesh to about 140 mesh) and may have a cleaning operation period of about 90 secs. to about 240 secs.

In other embodiments, the integrated flush controller may be operable to close the flush valve of any filter device after the difference between the inlet pressure and the outlet pressure of the corresponding filter device drops by a predetermined amount during the cleaning operation. For example, once the threshold pressure differential between the inlet and the outlet of the filter device rises to a pre-determined threshold, the flush controller opens the corresponding flush valve to initiate a cleaning operation. At the initiation of the cleaning operation, the flush controller may record a pressure reading from the fluid pressure sensors at the inlet and the outlet and compare them to determine the pressure differential at the beginning of the cleaning operation. The flush control may continue to record pressure readings from the fluid pressure sensors in the inlet and the outlet of the filter device at a predetermined interval (e.g., an interval in a range about every 0.1 seconds to 5 seconds) to determine a pressure differential between the inlet and the outlet, and when the pressure differential drops from its initial reading during the cleaning operation by a predetermined amount (e.g., in a range of about 1 PSI to about 3 PSI), the integrated controller may then send an electronic signal to the flush valve to close the valve and end the cleaning operation.

In still further embodiments, the integrated controller may be operable to perform a punctuated cleaning operation in which the flush valve is opened for a short period (e.g., a period sufficient to run the vacuum nozzles over all or substantially all of the interior surface of the filter element once—in a range of about 10 seconds to about 1 minute, or any value therein). After the short cleaning period, the flush valve may be closed to allow the controller to receive measurements of the inlet pressure and outlet pressure of the filter device to determine the pressure differential. The controller may then compare the pressure differential to a target pressure differential stored in the memory of the controller, and if the pressure differential is lower than the target pressure differential, the cleaning operation is terminated. If the pressure differential is higher than the target pressure differential, the controller will initiate a second short cleaning period and then retest the pressure differential thereafter. This process will continue until the pressure differential is reduced to below the target pressure differential.

In some embodiments, the integrated controller may be operable to independently control the outlet valve of each of the filter devices. In some embodiments, when the difference between the pressure at the water inlet and the water outlet of any filter device fails to reach the preferred value after the corresponding filter device's flush valve has been open for a predetermined time (e.g., from about 30 seconds to about 5 minutes), the integrated controller may be operable to close the corresponding filter device's outlet valve. The flushing of organic solids and debris from the inner surface of the filter element of the corresponding filter device may thus be enhanced. In some embodiments, the integrated controller may be operable to re-open the corresponding filter device's outlet valve after a predetermined time (e.g., from 10 seconds to 2 minutes).

The filtering system may also include several other valves that may be electronically controlled and actuated, and that may be in electronic communication with the integrated controller. The filtering system may include a first valve in the inlet pipe, one or more valves in the chemical injection system for releasing chemicals into a filtrate produced by the filter devices, a valve controlling flow through the outlet pipe, and valves within one or more emission device(s), to allow the controller to direct the filtrate to one or more emission devices independently and/or in a predetermined pattern.

The integrated controller may also be programed to compare the data values provided by the multiple sensors in the filtering system to pre-determined values stored in a memory. For example, the integrated controller may be in electronic communication with a pH sensor of the chemical monitoring and injection system. The integrated controller programmed with acceptable pH values (e.g., pH in a range of about 5 to about 7.5, or any value or range of values therein) for the filtrate, and may continuously monitor the pH of the filtrate, until the pH reaches an unacceptable level, at which point the integrated controller may send a signal to open a valve in the chemical injection system and/or activate a pump in the chemical injection system to introduce a chemically active solution (e.g., an acid, a base, and/or buffer) into the filtrate to adjust the pH of the filtrate. The controller may be programmed with a matrix of combinations of data points, with the required action to take by the controller in response to the combination of data points. For example, the amount of chemically active solution (e.g., acid, base, or buffer) may be determined by comparing a combination of flow rate (e.g., measured by a flow sensor) and pH (e.g., measured by a pH sensor) to a matrix of values stored in the controller's memory to determine the proper volume of chemically active solution to introduce into the filtrate to bring the pH into the pre-determined range of acceptable values. In other examples, the integrated controller may be operable to open the chemical injection valve and allow the chemically active solution to flow into the filtrate at a varying flow rate until the pH is measured to be within a predetermined range, at which point the flow rate of the chemically active solution is maintained. In order to allow the chemically active solution to diffuse into the filtrate and take effect prior to taking pH measurements, the pH sensor may be positioned downstream of the point at which the chemically active solution is introduced into the filtrate.

In some embodiments, the integrated controller may regulate the activity of the intake pump to adjust the volume and rate of irrigation water needed for one or more crop fields irrigated by the filtrate. In some implementations, the integrated controller may be programed to irrigate a single field at a pre-determined time of day (e.g., at night). Accordingly, the integrated controller activates the variable frequency drive controller at the pre-determined time and supplies irrigation water to the field. In other implementations, the integrated controller may be programed to irrigate multiple fields at different times, and in some such implementations the fields may have different filtrate volumes and flow rate requirements. The integrated controller in such implementations may cycle between irrigation sessions for each of the multiple fields, and control the operation of the intake pump to adjust the volume and rate of effluent pumped into the filtration system as the integrated controller switches between irrigation sessions for separate fields. In such implementations, the filtering system may include a manifold connected to allocation conduits feeding each of the multiple fields, with each outlet including an emission valve in electronic communication with the integrated controller. The integrated controller may control the opening and closing of the emission valves, according to an irrigation schedule or algorithm.

In some embodiments, the integrated controller operation may be coordinated with other systems to increase efficiencies of a broader operation (e.g., a dairy, farm, or ranch). For example, the controller may be in electronic communication with a solar energy source and the controller may be programed to wait until the power available to the filtering system rises above a pre-determined level before the controller sends a signal to drive pump to initiate and pump water through the filtering system (e.g., power production in a range of about 1000 W to about 2500 W).

Outlet Pipeline

Embodiments of the outlet pipeline may include a watertight pathway from a water outlet of a final filter device of the plurality of filter devices to one or more filtrate allocations (e.g., irrigation emission devices in one or more crop fields). In some embodiments, the outlet pipeline may include at least one of PVC, metal, high-density polyethylene, acrylonitrile-butadiene-styrene, and the like. Embodiments of the outlet pipeline may have an inner diameter sufficient to provide enough filtered effluent water to supply the acreage of the crop field (e.g., 4 inches to 12 inches).

In some embodiments, the outlet pipeline may have a second pressure regulating valve for controlling the flow rate of filtrate through the outlet pipeline. The second pressure regulating valve may include at least one of a butterfly valve, a diaphragm valve, a globe valve, a gate valve, or the like. In some embodiments, the second pressure regulating valve may include an electronic actuator for adjusting the position of the second pressure regulating valve, the electronic actuator being in electronic communication with the integrated controller and being capable of receiving a signal to adjust the position of the second pressure regulating valve based on the signal. In some embodiments, the position of the second pressure regulating valve may be adjusted by the integrated controller in response to the water pressure at the water outlet of the final filter device, the concentration of organic material in the effluent water, the initiation of cleaning operations of the plurality of filter devices, and/or the volume of water required at the emission device to sufficiently water the crop field. The second pressure regulating valve may have a manual actuator handle and may be operable to be adjusted manually as an override or, in some embodiments, as the sole means of operating the valve.

In some embodiments, the outlet pipeline may include a proximal section and a distal section, the proximal section comprising a single pipeline in fluid communication with the outlet of the final filter device, and the distal section being in fluid communication with one or more allocation conduits (e.g., emission devices). In some embodiments, the distal section may include a manifold and a plurality of allocation conduits, each providing filtrate to a different allocation (e.g., drip irrigation, another filtration system for further refinement of the filtrate for preparing drinking water, and/or other allocations). In some embodiments, the allocation conduits may each connect with irrigation emission devices (e.g., drip irrigation tubing). The emission manifold may include emission valves for controlling the flow of filtrate into the allocation conduits. The emission valves may have electronic actuators for adjusting the positions of the valves, and the valves may be in electronic communication with the integrated controller. The integrated controller may open and close the emission valves in accordance with programming therein for directing and timing the delivery of the filtrate to different allocations.

The outlet pipeline and/or the allocation conduits may have at least one air release vent to allow air to escape as the outlet pipeline fills with water, and to allow air to enter the outlet pipeline as water pressure drops in the outlet pipeline, thereby preventing debris from backfilling into the emission device. The at least one air release vent may include an opening and a float valve, the float valve being operable to close the opening by being raised by water entering the air release vent. The air release vent may be a plurality of air release vents advantageously positioned along the outlet pipeline at locations likely to require the release of air pockets.

Emission Device

The emission devices of the present invention may include, e.g., a drip tape, irrigation tubing with micro sprinklers, or any device for receiving filtrate of various qualities from the filtering system of the present invention. The filtering systems of the present invention may be for producing nutrient rich irrigation water, drinking water, a rough filtrate for further processing into drinking water, water for use in an industrial process, and other applications. In irrigation applications, the drip tape may be a commercially available drip tape such as a polyethylene tube with a plurality of dripper openings. The plurality of dripper openings may each include a filtration flow path and a flap. The filtration flow path may be capable of filtering out organic solids and debris of a size which may clog the dripper opening from the inside; and, the flap may cover the dripper opening from the outside to prevent the backflow of organic solids and debris into the dripper opening when the emission device loses water pressure. In some implementations, the dripper opening may have a mesh rating that is the same as or similar to the mesh rating of the filter element in the final filter device.

As mentioned above, the filtering system may include a manifold connected to various filtrate receivers, such as crop field emission devices, a drinking water tank, or other receivers. In some embodiments, the manifold may deliver water to multiple emission devices (e.g., irrigation tubing), each of which delivers filtrate to a different crop field. Each of the crop fields may be of a different size and may have different crops, and thus each field may have different irrigation requirements. In such embodiments, the integrated controller may be programed to include an algorithm for providing a certain volume of filtrate at a certain rate to each emission device over a given period (e.g., a 24-hour period).

In embodiments where the manifold is connected to one or more filtrate receivers that utilize the water for purpose other than drip tape or irrigation tubing. For example, the receiver and emission devices may include structures other than irrigation tape or a piping system connected with a tank for storing the filtrate for later use, where the tank may be in fluid connection with a pump system for driving the flow of the filtrate to a water trough (for farm animals), one or more dispenser nozzles for delivering the filtrate into an industrial process, a decorative water feature (e.g., a pond, waterfall, etc.), and other applications.

Chemical Injection System

In some embodiments, the filtering system may include a chemical injection system. The chemical injection system may include a housing, one or more injecting devices, one or more connecting conduits, and one or more control valves. In some embodiments, the housing may include one or more water-tight tanks for holding a chemical, the chemical comprising at least one of a pure form, a mixture, an aqueous solution, a colloidal suspension, and the like. When activated by the integrated controller, the chemical injection system may inject measured amounts of chemicals into the filtrate to regulate the level of one or more chemical conditions according to a pre-determined level or range of acceptable levels. For example, the integrated controller may operate the chemical injection system to regulate the pH level of the filtrate that is introduced into an irrigation system. Other beneficial chemical agents may be added into the filtrate as well, such as an anti-microbial agents, herbicides, pesticides, fertilizers, etc. The chemical injection system may include one or more injecting devices, and an injection pump, which may include a motor controlled by the integrated controller. In some embodiments, the injecting device may be operable to receive the chemical from a chemical injection tank and deliver a predetermined amount of the chemical into one or more injection points along the filtering system, e.g., into the intake pipeline, the outlet pipeline, and/or other locations. The chemical injection system may include a connecting pipeline that connects the injecting device to a chemical injection tank and an injection point along the filtering system. Each injecting device may include an injection valve for controlling release of the chemical agents. The injection valves may include at least one of a butterfly valve, a diaphragm valve, a globe valve, a gate valve, or the like.

In some embodiments, the chemical held in the at least one chemical injection tank may include one or more of a pH regulating agent, a fertilizer, an herbicide, a pesticide, and an antimicrobial agent. The fertilizer may be a solution of ammonia, ammonium nitrate, urea, orthophosphate ions, and/or fertilizer compounds. The antimicrobial agent may be a sodium tetraborohydrate decahydrate, mancozeb, tricyclazole, carbendazim, hexaconazole, metalaxyl, benomyl, copper oxychloride, copper hydroxide, and/or other anti-microbial (e.g., fungicidal) agents. The pH regulating agent may be an acid (e.g., HCl, $HNO_3$, $H_2SO_4$, acetic acid, and other appropriate acids), a base (e.g., NaOH, $NH_4OH$, and other appropriate bases), and/or a buffering agent (e.g., monopotassium phosphate bicarbonate, citric acid, and other appropriate buffering agents).

In some embodiments, the chemical injection system may include a plurality of chemical injection tanks, each holding a different chemical. In some embodiments, the plurality of chemical injection tanks may include three chemical injection tanks, each holding one of the fertilizer, the antimicrobial agent, and the pH regulating agent.

In some embodiments, the position of the injection valve may be adjusted to take into account at least one of the level of nutrients in the effluent water, the concentration of microbes in the effluent water, and the pH level of the effluent water. In some embodiments, the injection valve may have an electronic actuator in electronic communication with the integrated controller, and the integrated controller may be operable to adjust the injection valve (e.g., open, close, adjust the aperture, etc.) via an electronic signal to the actuator.

The filtering system may also include one or more chemical sensors (e.g., sensors for measuring pH, salinity, and other characteristics of the filtrate) located at various points in the filtering system. The integrated controller may be in electronic communication with the chemical sensors and monitor and record the data provided by the chemical sensors. For example, the integrated controller may use the data provided by a pH sensor to monitor the pH of the filtrate and compare it to a pre-determined value or range of values stored in a memory of the integrated controller. When the integrated controller determines that the pH of the filtrate is out of the pre-determined range, it may send an electronic signal to an injection device of the chemical injection system to inject a volume of a chemical agent to adjust the pH to a desired level in the filtrate.

Several embodiments are discussed below, but the example embodiments shall not be interpreted as an exhaustive list. One with ordinary skill in the art will recognize that the scope of the present invention includes further variations and equivalents to the specific examples described herein.

In one implementation, the present invention relates to a method for filtering effluent water for use in drip irrigation, comprising the steps of providing an injection pump at an effluent water source; providing a plurality of filter devices arranged in sequence with progressively finer filter elements, each filter device having an independently controlled flush valve; providing an emission device for drip irrigation in a crop field; providing an intake pipeline for connecting the intake pump to the plurality of filter devices, the intake pipeline comprising a first pressure regulating valve; providing an outlet pipeline for connecting the plurality of filter devices to the emission device, the outlet pipeline comprising a second pressure regulating valve; and activating the intake pump.

In some implementations, the effluent water source may comprise a wastewater pond. In some implementations, the intake pump comprises a variable frequency drive controller, an outer screen, a nozzle for cleaning the outer screen, and a floating platform. In some implementations, the flush valve comprises an air actuated diaphragm valve. In some implementations, the flush valve of each filter device is controlled by an independent flush controller, the independent flush controller being operable to open the flush valve upon the difference in water pressure at a water intake and a water outlet of the filter device reaching a threshold value. In some implementations, the independent flush controller is operable to close the flush valve upon the difference in pressure at the water intake and the water outlet reaching a preferred value, or after a predetermined time. In some implementations, the independent flush controller may be operable to close the water outlet if the difference in pressure at the water intake and the water outlet does not reach the preferred value after the predetermined time.

In some implementations, the plurality of filter devices may further comprise an integrated flush controller, the integrated flush controller being operable to open the flush valve of any filter device of the plurality of filter devices upon the difference in water pressure at a water intake and a water outlet of the filter device reaching a threshold value. In some implementations, the integrated flush controller is operable to close the flush valve upon the difference in pressure at the water intake and the water outlet reaching a preferred value, or after a predetermined time. In some implementations, the integrated flush controller is operable to close the water outlet if the difference in pressure at the water intake and the water outlet does not reach the preferred value after the predetermined time.

In some implementations, the emission device comprises a plurality of emission devices, and the outlet pipeline comprises a distal section, the distal section comprising a plurality of pipelines, each pipeline being in fluid communication with at least one emission device of the plurality of emission devices. In some implementations, the method may further comprise the step of injecting a chemical into the effluent water. In some implementations, the chemical comprises at least one of a fertilizer, an antimicrobial agent, and a pH regulating agent. In some implementations, the chemical is injected into the effluent water via a chemical injection tank, the chemical injection tank comprising a housing, an injecting device, a connecting pipeline, and a control valve. In some implementations, the first pressure regulating valve comprises a butterfly valve, the butterfly valve being operable to control a volume of effluent water passing through the intake pipeline. In some implementations, the first pressure regulating valve comprises an electric motor in electronic communication with an integrated flush controller, the electric motor being operable to receive a signal from the integrated flush controller and adjust a position of the first pressure regulating valve based on the signal. In some implementations, the second pressure regulating valve comprises a butterfly valve, the butterfly valve being operable to control a volume of effluent water passing through the outlet pipeline. In some implementations, the second pressure regulating valve comprises an electric motor in electronic communication with an integrated flush controller, the electric motor being operable to receive a signal from the integrated flush controller and adjust a position of the second pressure regulating valve based on said signal. In some implementations, each of the intake pipeline, the plurality of filter devices, and the outlet pipeline comprise at least one air release vent.

In one implementation, the present invention relates to a method for filtering organic solids and debris from a wastewater pond for use in a drip irrigation system on a crop field, comprising the steps of: pumping effluent water from the wastewater pond via a self-cleaning intake pump; filtering the effluent water in a staged manner through a series of filter devices with progressively finer filter elements, a filter element of a final filter device in said series of filter devices having a mesh rating of at least 120, and each filter device in the series of filter devices having an independently controlled flush valve for controlling a cleaning element of the filter device; injecting at least one of a fertilizer, an antimicrobial agent, and a pH regulating agent into the effluent water; and piping the effluent water from the series of filter devices to an emission device, the emission device being operable to provide drip irrigation to the crop field.

It is an objective of the present invention to provide a multi-stage filtration system that includes a filtrate with a precise solute and nutrient content.

It is a further objective of the present invention to provide a multi-stage filtration system that includes self-cleaning filter stages that avoid or reduce shutdown of the system for cleaning operations.

It is a further objective of the present invention to provide a filtering system that includes a controller system that is operable to monitor the quality and condition of the filtrate produced by the filtering system and/or the effluent to be filtered, as well as other conditions in the system.

It is a further objective of the present invention to provide a filtering system that includes a chemical injection system operable to add one or more chemicals into a filtrate to adjust the chemical condition of the filtrate and/or to deliver chemical agents into the filtrate.

It is a further objective of the present invention to provide a filtering system that is operable to adjust flow rate of effluent through the system based on several factors, including the volume of effluent water in the effluent source, the concentration of solids in the effluent, the frequency of cleaning operations of the filter devices, and the amount of filtrate needed in the systems (e.g., irrigation systems) provided with filtrate.

It is a further objective of the present invention to provide a filtering system in which the valves for flushing the filter devices are air actuated diaphragm valves, in contrast to conventional flush valves that use effluent water for actuation. The air actuated valves are both quick acting and avoid damage from debris accumulation.

It is a further objective of the present invention to provide a filtering system that includes a variable frequency drive pump for drawing effluent into the system, which allows a controller to accelerate or decelerate the function of the pump and the flow rate in order to maintain a constant pressure in the filter devices.

It is a further objective of the present invention to provide a filtering system that includes pressure sensors to monitor the pressure of the effluent and filtrate at various points in the filtering system, where the pressure sensors are protected by a diaphragm wafer from the effluent to prevent contamination and damage to the pressure sensors.

Additional aspects and objects of the invention will be apparent from the detailed descriptions and the claims herein.

BRIEF DESCRIPTION OF THE DRAWINGS

FIG. 2B shows a side view of an intake pump, according to an embodiment of the present invention.

DETAILED DESCRIPTION OF THE EXEMPLARY EMBODIMENTS

Figure 1:
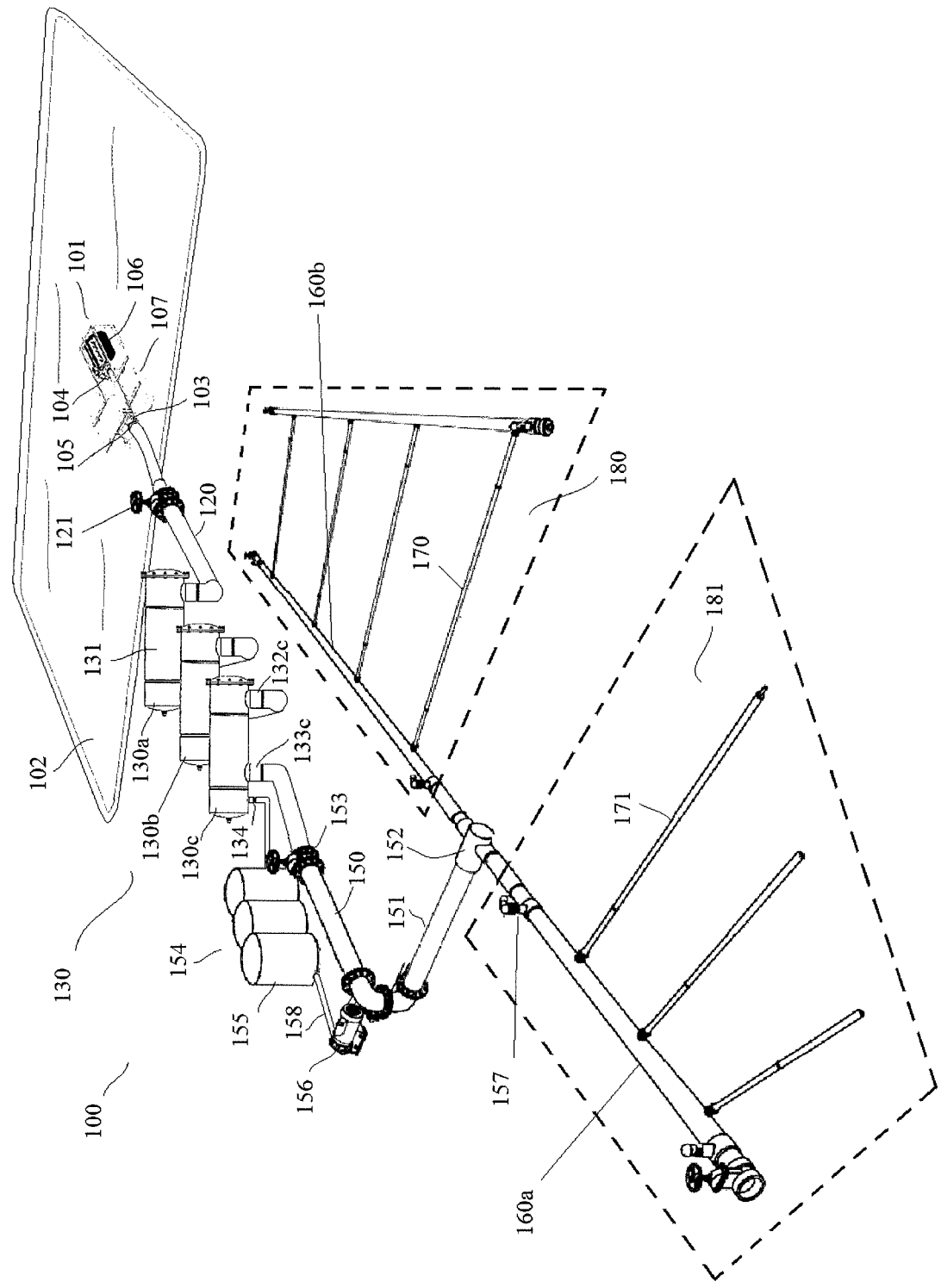
FIG. 1 shows a perspective view of a system for filtering effluent water for use in drip irrigation, according to an embodiment of the present invention.

Reference will now be made in detail to certain embodiments of the invention, examples of which are illustrated in the accompanying drawings. While the invention will be described in reference to these embodiments, it will be understood that they are not intended to limit the invention. Conversely, the invention is intended to cover alternatives, modifications, and equivalents that are included within the scope of the invention as defined by the claims. In the following disclosure, specific details are given as a way to provide a thorough understanding of the invention. However, it will be apparent to one skilled in the art that the present invention may be practiced without these specific details.

Referring to the drawings, wherein like reference characters designate like or corresponding parts throughout the several views, and referring particularly to FIGS. 1-5, it is seen that the present invention includes various embodiments of a method for filtering effluent water for use in drip irrigation which is highly efficient and self-cleaning.

Without limiting the invention, FIG. 1 illustrates an exemplary filtering system 100 for filtering effluent water for recycled use. The system 100 may comprise an intake system 101, an intake pipeline 120, a plurality of filter devices 130a-130c, an outlet pipeline 150, chemical injection system 154, and emission devices 170 and 171. The intake pump system 101 may be positioned at an effluent source 102, which may be a wastewater settling pond. The intake system 101 may be operable to float on the surface of the effluent source 102 such that it can draw effluent from the surface of the effluent source 102. The intake pump system 101 may include an intake pump 103 (e.g., a centrifugal pump), an intake 104, an outlet 105, a filter screen 106, and a floating platform 107.

The intake pipeline 120 may allow fluid communication between the intake system 101 and the plurality of filter devices 130a-130c. The intake pipeline 120 may include a first pressure regulating valve 121. The plurality of filter devices 130a-130c may be arranged in sequence with progressively finer filter elements (see FIG. 4 for detail) from a first filter device 130a to a second filter device 130b, the final filter device 130c having a screen filter with a mesh rating sufficient to filter out any organic solids or debris which may clog the emission devices 170 and 171 (e.g., a mesh rating in a range of about 100 to about 140, such as 120). In some embodiments, each filter device of the plurality of filter devices may comprise a housing 131, a water intake 132, a water outlet 133, and a flush outlet 134.

The outlet pipeline 150 may allow fluid communication between the plurality of filter devices 130a-130c and the emission devices 170 and 171, the emission device(s) being located in crop fields 180 and 181. In some embodiments, the outlet pipeline may comprise a durable material that can be positioned below ground without deterioration, such as PVC, high-density polyethylene, acrylonitrile-butadiene-styrene, non-corrodible metals, and the like. In a preferred embodiment, the outlet pipeline 150 may comprise a proximal section 151 and a manifold 152, where the proximal section 151 comprising a single pipeline is in fluid communication with the outlet 133c of the final filter device 130c, and the manifold 152 is in fluid communication with the emission devices 170 and 171. Allocation conduits 160a, 160b may connect the manifold 152 to each of the emission devices 170 and 171. In such embodiments, the filtering system 100 may be operable to supply filtrate to each of multiple crop fields 180 and 181.

In some embodiments, the outlet pipeline 150 may comprise a second pressure regulating valve 153. Embodiments of the second pressure regulating valve 153 may be a butterfly valve, a diaphragm valve, a globe valve, a gate valve, or the like. The position of the second pressure regulating valve 153 may be adjusted to take into account the water pressure at the water outlet 133c of the final filter device 130c, the concentration of organic material in the effluent water, the running of cleaning cycles of the plurality of filter devices 130, and/or the volume of water required at the emission devices 170 and 171 to provide sufficient filtrate to the crop fields 180 and 181.

The filtering system may include at least one air release vent 157 at or near the outlet pipeline 150 to allow air to escape as the outlet pipeline 150 fills with filtrate, and to allow air to enter the distal part of the filtering system as water pressure drops in the outlet pipeline 150, preventing debris from backfilling into the emission devices 170 and 171. The at least one air release vent 157 may comprise an opening and a float valve, the float valve being operable to close the opening by being raised by water entering the air release vent 157. The air release vent 157 may comprise a plurality of air release vents advantageously positioned along the outlet pipeline 150 at locations likely to require the release of air pockets.

The filtering system may include an apparatus for injecting a fertilizer and/or other chemicals into the filtrate to provide further nutrients and/or regulate the chemical conditions of the filtrate provided to the crop fields 180 and 181. Examples of other chemicals include an antimicrobial agent (e.g., a fungicide) to prevent microbial accumulation in the emission device 170, a pH regulating agent to maintain pH of the filtrate at a pre-determined level (e.g., a neutral to slightly acidic pH level), and/or chemical agents to bolster the crops grown in crop fields 180 and 181. The filtering system 100 may include one or more chemical injection tanks 155 for storing and providing fertilizer and/or other chemicals for injection into the filtrate prior to delivery into the emission devices 170 and 171. Each of the chemical injection tanks 155 may hold a different chemical, e.g., the tanks respectively may contain a fertilizer, an anti-microbial agent, and a pH regulating agent. The tanks 155 may be water-tight tanks for holding a chemical, the chemical comprising at least one of a pure form, a mixture, an aqueous solution, a colloidal suspension, and the like. The chemical injection system 154 may further include an injecting device 156, and connecting conduits 158 to provide fluid connection between the tanks 155 and the injecting device 156.

The injecting device 156 may comprise an injection pump or other commercially available chemical injection device. In some embodiments, the injecting device 156 may be operable to receive the chemical from the tanks 155 via the connecting conduits 158 and deliver a predetermined amount of the chemical into the outlet pipeline 150 or another portion of the filtering system upstream of the emission devices (e.g., the manifold 152, the intake pipeline 120, etc.), via the connecting pipeline 158.

Figure 2A:
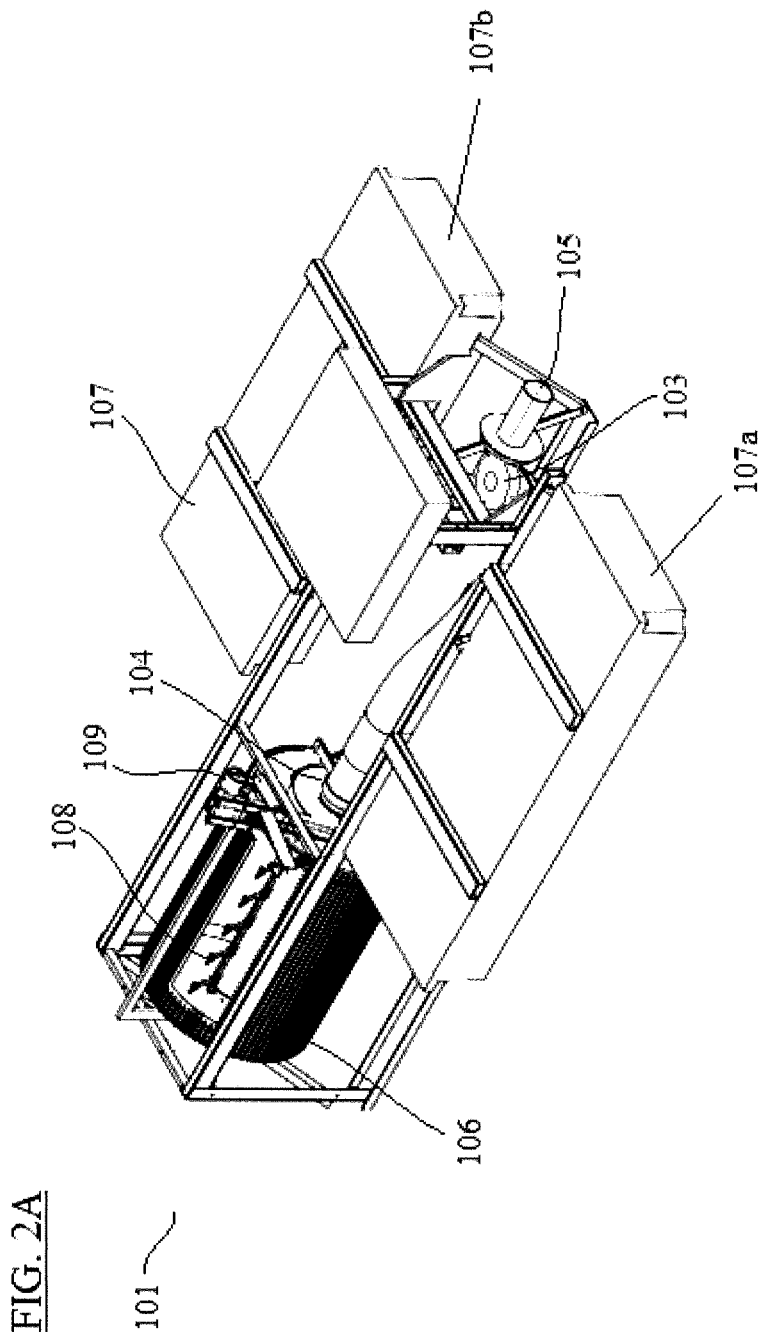
FIG. 2A shows a perspective view of an intake pump, according to an embodiment of the present invention.

Without limiting the invention, FIGS. 2A and 2B illustrate an exemplary intake system 101 according to an embodiment of the present invention. The intake system 101 may comprise a pump 103, an intake 104, an outlet 105, a power source, a variable frequency drive controller, and a filter element 106. The filter element 106 may be a cylindrical, barrel-shaped, or tubular filter element operable to filter organic solids and other debris from the effluent prior to the effluent entering the intake 104. The filter element 106 may comprise a metal mesh with a low mesh rating (e.g., in a range of about 10 mesh to about 45 mesh, or any value or range of values therein), and may be capable of filtering out solids large enough to clog the intake pump 101. The intake pump system 101 may further comprise a floating platform 107 operable to support and buoy the weight of the filtering system and at least one person, allowing a maintenance person to stand on the intake pump system for maintenance operations.

The filter element 106 may have a cylindrical, barrel-like, or tubular shape that may rotate about its longitudinal axis. The filter element 106 may comprise a submerged portion 106a and an above-water portion 106b, and may constantly rotate about its longitudinal axis, which may be positioned such that it is parallel to the surface of the effluent source 102. As the filter element spins, the submerged portion 106a constantly cycles. Such positioning and shape of the filter element 106 allows it to be rotated on its axis while it is filtering the effluent, and to be cleaned during operation.

The intake system 101 may include a self-cleaning mechanism 108. The self-cleaning mechanism 108 for the filter element 106 may comprise one or more nozzles, the nozzle being in liquid communication with at least one of a secondary pump 109, or the outlet 105, and being operable to direct a spray of water through the above-water portion 106b of the filter element 106 as it rotates, such that solids filtered from the effluent source 102 and lodged in the filter element 106 are blown off of the filter element 106. In some embodiments, the cleaning mechanism 108 may comprise a plurality of nozzles, each nozzle being in liquid communication with at least one of the secondary pump 109 and the outlet 105, and each being capable of directing a spray of water at the above-water section 106b.

The floating platform 107 may comprise a platform with flotation devices 107a and 107b (e.g., pontoons) for maintaining the intake pump 101 such that it maintains the submerged portion 106a in the source 102, and the above-water portion 106b and a scaffold for mounting the intake pump 106 above the effluent source 102.

The effluent drawn by the intake pump system 101 may be provided to the filter devices through an outlet 105 and through the intake pipeline 120. The first pressure regulating valve 121 may be positioned in the intake pipeline 120 and assist in regulating the volume and flow rate of effluent delivered to the filter devices 130.

Figure 3A:
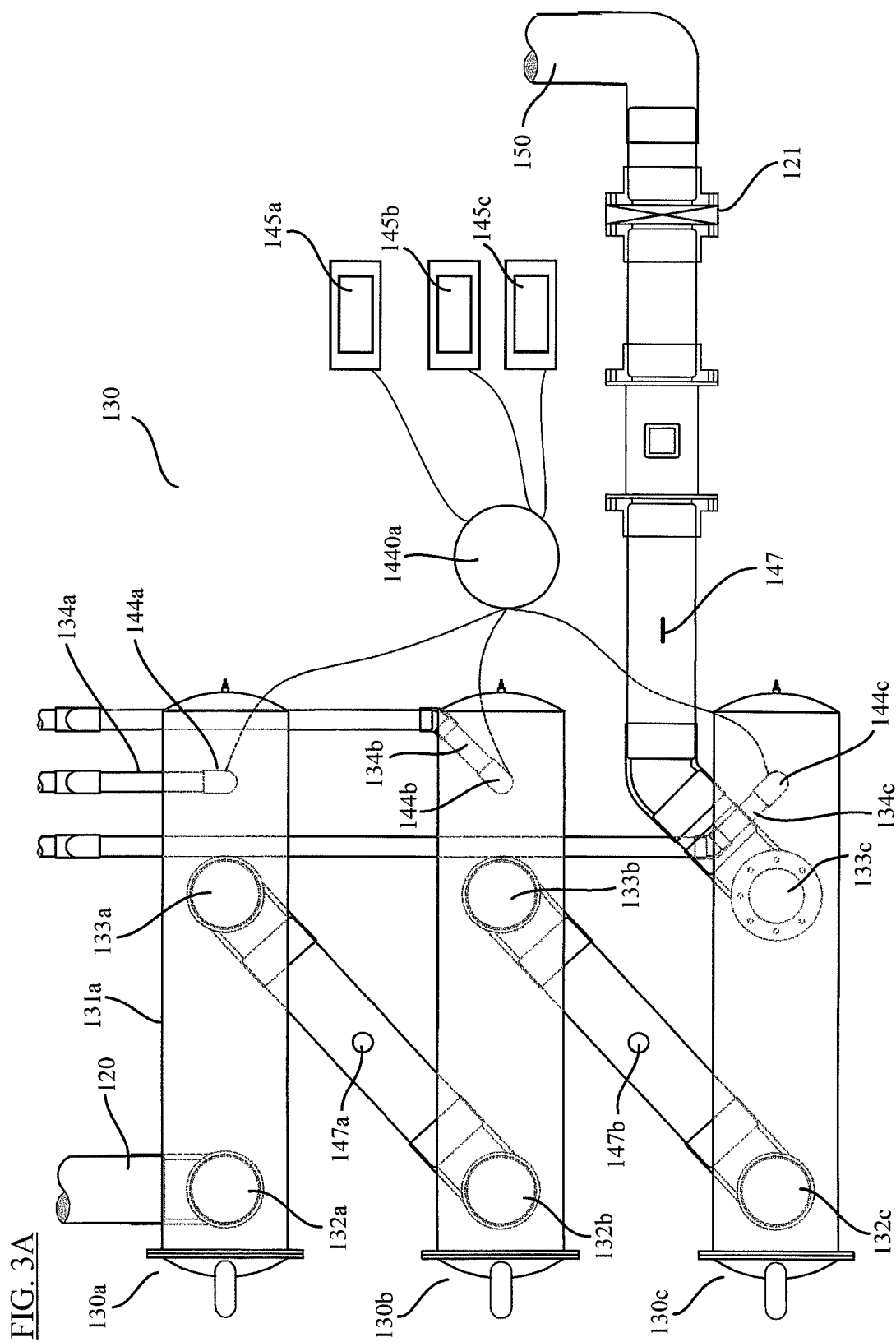
FIG. 3A shows a top-down view of a plurality of filter devices, according to an embodiment of the present invention.

Without limiting the invention, FIG. 3A illustrates exemplary filter devices 130a, 130b, and 130c that are connected in sequence. The filter devices 130a, 130b, and 130c may each include a filter element to catch sequentially smaller organic solids and debris, where the filter element of each successive filter device has a higher mesh rating. In some embodiments, the final filter device 130c may comprise a mesh rating capable of filtering debris and particulates that may block the small openings of the emission devices 170 and 171 (e.g., a mesh rating of 100 to 140), but retaining nutrients for plant growth.

Each filter device 130a, 130b, 130c may comprise an independent flush controller (e.g., 145a, 145b, 145c) which opens a flush valve (e.g., 144a, 144b, 144c) and activates a cleaning process when the filter element in the filter device becomes fouled and requires cleaning. The criteria for initiating a cleaning operation may be a threshold pressure differential between the water intake of the filter device and the water outlet of the filter device (e.g., between 132a and 133a, 132b and 133b, or 132c and 133c). In some embodiments, each flush valve 144a, 144b, and 144c may comprise an air pressure-actuated diaphragm valve, the flush valves 144a, 144b, and 144c being in air pressure communication with an associated air compressor 1440.

Figure 3B:
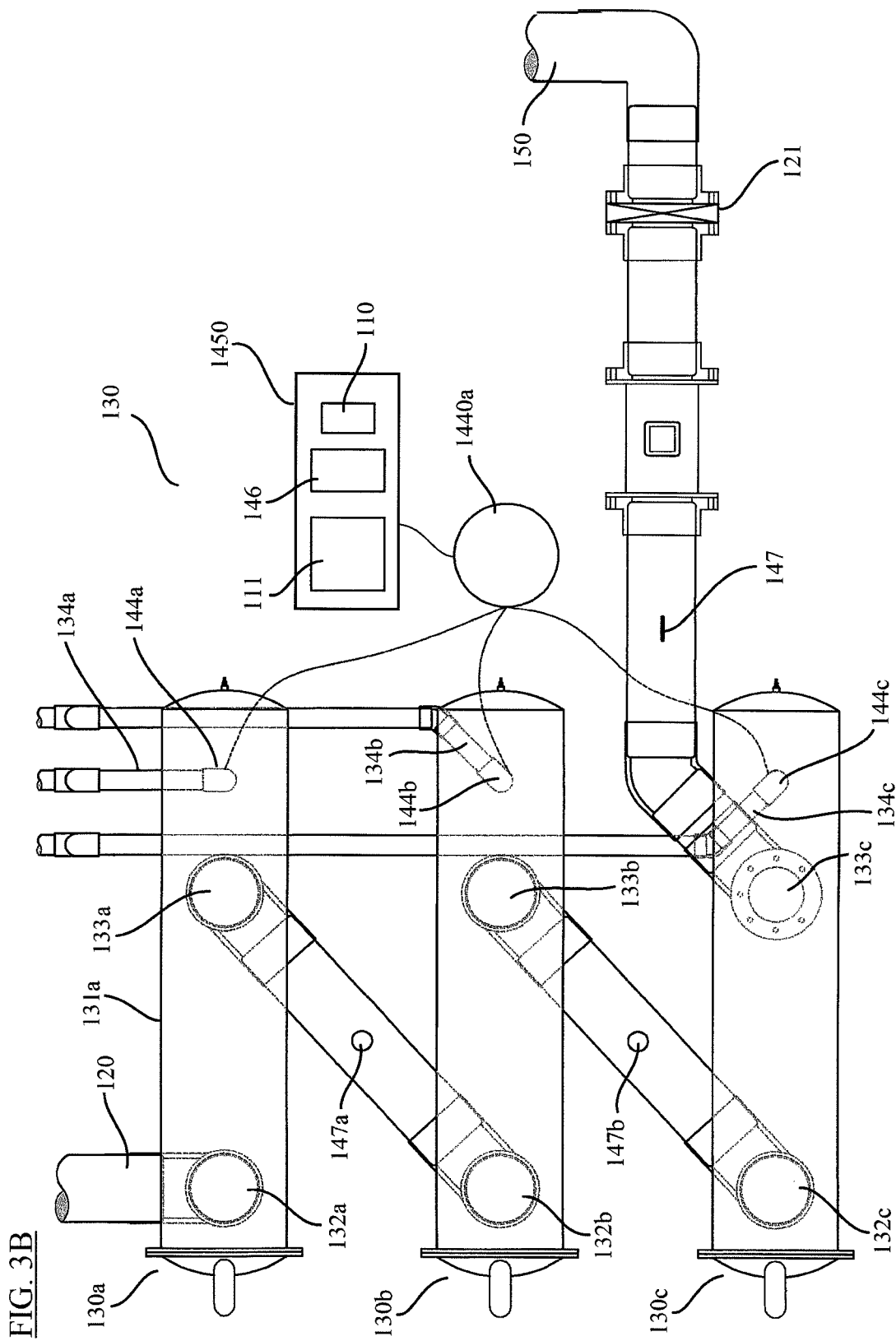
FIG. 3B shows a top-down view of a plurality of filter devices, according to an embodiment of the present invention.

In some embodiments, the filtering system comprises an integrated controller for controlling the cleaning operations of each of the filter devices. As shown in FIG. 3B, the filtering system may include an integrated controller 1450 for monitoring the water pressure at the water inlets 132a, 132b, and 132c and the water outlets 133a, 133b, and 133c, and the pressure differentials therebetween for each filter device 130a, 130b, and 130c. In some embodiments, the integrated controller may open a flush valve 144a, 144b, and 144c to activate a cleaning process when the filter element of a filter device becomes fouled and requires cleaning, which is indicated by the pressure differential between the water intake (e.g., 132a, 132b, or 132c) and the water outlet (e.g., 133a, 133b, and 133c) reaching a threshold value: e.g., where the pressure differential between at the water intake is higher than the pressure at the water outlet (e.g., by a pressure in a range of about 1 PSI to about 10 PSI, or any value or range of values therein). In some embodiments, each flush valve 144a, 144b, and 144c may comprise an air pressure-actuated diaphragm valve, the flush valves being in air pressure communication with an air compressor 1440 controlled by the integrated controller 1450.

The filter devices 130a, 130b, and 130c may be self-cleaning and operable to flush any entrapped solids by using a series of vacuum wands that spin around on the inside of a filter element within the filter device and draw the solids off of the filter element to be flushed from the filter device (see the discussion of FIG. 4 below for more detail). The operation of the vacuum wands occurs during a special cleaning operation that may be initiated by an electronic controller (e.g., an independent flush controller, or an integrated controller) when a predetermined condition or set of conditions (e.g., pressure drop across the filter device from inlet to outlet) are detected. The cleaning operation may be initiated by opening a flush valve that drops the pressure in a flush compartment, thereby causing the effluent to be drawn ("vacuumed") into the vacuum wands, along with debris from the interior of the filter element, and flushed from the filter device.

Figure 4:
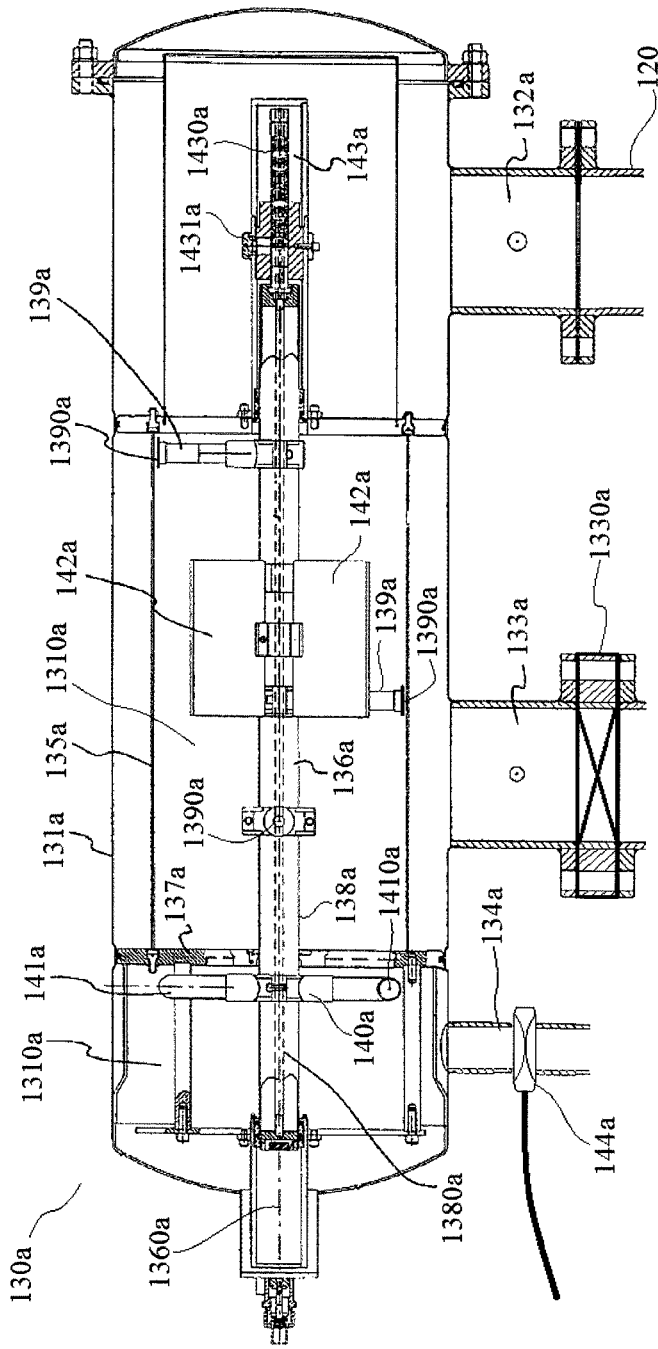
FIG. 4 shows a side cross-section view of a filter device, according to an embodiment of the present invention.

Without limiting the invention, FIG. 4 illustrates a first filter device 130a of the plurality of filter devices 130. Each of the filter devices may include the same elements and design as illustrated in the example of FIG. 4. Embodiments of the filter device 130a may comprise a housing 131a, a water intake 132a, a water outlet 133a, a flush outlet 134a, a filter element 135a, a cleaning mechanism 136a, and a flush valve 144a.

The housing 131a may comprise a substantially cylindrical shape with an internal bulkhead 137a separating a filter compartment 131a and a flush compartment 1310a. The filter compartment 131a may encompass the filter element 135a, the effluent intake 132a, and the filtrate outlet 133a. The flush compartment 1310a may encompass the flush outlet 134a. In some embodiments, the water outlet 133a may comprise an outlet valve 1330a, the outlet valve 1330a being capable of controlling the flow of water through the water outlet 133a. In some embodiments, the outlet valve 1330a may comprise at least one of a diaphragm valve, a globe valve, a gate valve, or the like.

The effluent inlet 132a of the filter device 130a may be in fluid communication with the intake pipeline 120, and may comprise an inner diameter substantially equal to an inner diameter of the intake pipeline 120. The water outlet of 133a of the filter device 130a may be in fluid communication with the water inlet 132b of the second filter device 130b, and the water outlet 133b of the second filter device may be in fluid communication with the water inlet 132c of a third filter device 130c. In some embodiments, each of the water inlets and each of the water outlets of each of the filter devices may comprise a substantially equal inner diameter. In some embodiments, the water outlet 133c of the filter device 130c may comprise an inner diameter substantially equal to an inner diameter of the outlet pipeline 150.

The filter element of each filter device of the plurality of filter devices 130 may comprise a screen filter with a substantially cylindrically shape positioned to filter effluent water flowing from the water inlet to the water outlet. The filter elements may comprise any suitable material for withstanding the water pressure and corrosive effects of the effluent water passing through the filter device (e.g., stainless steel, copper, or other appropriate materials). The mesh rating of the first filter element 135a may be in a range of about 45 mesh to about 80 mesh. It is to be understood that the mesh rating of the filter elements of the different filter devices in the filtering system may have different mesh ratings. For example, the successive filter devices may include filter elements with progressively higher mesh ratings, such that the effluent is filtered in a progressively finer manner. The filter element 135c of the final filter device 130c may comprise a mesh rating sufficient to filter out organic solids and debris capable of clogging the emission device(s) (e.g., a mesh rating of 100 to 140).

The cleaning mechanism 136a may comprise a central support 138a with an inner channel 170a traversing the bulkhead 137a, the inner channel 170a being in fluid communication with both a plurality of vacuum wands 139a radially positioned about the central support 136a in the filter compartment 131a, and a plurality of rotor arms 141a of a water driven motor 140a radially positioned about the central support 138a in the flush compartment 1310a. The cleaning mechanism 136a may traverse the bulkhead 137a in a watertight manner. In some embodiments, the cleaning mechanism 136a may further comprise a plurality of fins 142a radially positioned about the central support in the filter compartment, the plurality of fins 142a being capable of regulating the speed of rotation of the cleaning mechanism 136a.

The cleaning mechanism 136a may be configured and positioned to be actuated by opening the flush valve 144a. In some embodiments, the rotor arms 141a of the motor 140a may each comprise a distal end with a rotor outlet 1410a, each distal end being curved in a same circumferential direction such that water passing out of the rotor outlets 1410a causes the cleaning mechanism 136a to rotate in the opposite direction of the expelled water. In some embodiments, each of the plurality of vacuum wands 139a may comprise a distal end with a vacuum inlet 1390a positioned close to the inner surface of the filter element 135a such that when the cleaning mechanism 136a is actuated and rotates about a central axis 1360a of the housing 131, the vacuum inlet 1390a rotates around the inner surface of the filter element 135a. The central support 136a may comprise a threaded end 143a, the threaded end 143a comprising a helical track 1430a with a cross sectional shape complementary to the shape of a tracking guide 1431a of the housing.

The combination of the helical track 1431a and the tracking guide 1431a may cause the cleaning mechanism to move back and forth along the central axis 1360a of the housing 131a when the cleaning mechanism 136a rotates. The cleaning mechanism 136a may be configured such that, as the cleaning mechanism 136a rotates about and moves back and forth along the central axis 1360a of the housing 131a, each of the vacuum inlets 1390a follows a helical path along the inner surface of the filter element 135a. The plurality of vacuum wands 139a may be positioned along the central support 138a such that the sum of the helical paths followed by the rotor inlets 1390a covers and cleans all or substantially all of the inner surface of the filter element 135a.

Opening the flush valve may allow water to flow from the filter compartment 1310a of the housing 131a, into the vacuum inlets 1390a of the plurality of vacuum wands 139a, through the central channel 1380a of the cleaning mechanism 136a, out of the rotor outlets 1410a of the plurality of rotor arms 141a, through the flush compartment 1310a, and out the flush outlet 134a. This process clears the debris built up during the filtration process from the filter element 135a and the filter device 130a. This process allows the filter device 130a to run in a practically continuous manner, without the need to take the filter device offline and dismantle it for cleaning and maintenance.

Each filter device may comprise the elements included in the description of first filter device 130a, and they may be connected in sequence as shown in FIGS. 3A-3B. As previously discussed, each filter device 130a, 130b, and 130c may have its own dedicated controller that monitors the upstream and downstream pressure of the filter device. When a predetermined pressure differential is detected (e.g., by pressure sensors in fluid connection with inlet and outlet piping) across the filter from inlet to outlet and the sensor data is communicated to the independent controller, a command is sent to open the flush valve for the filter device to initiate a cleaning operation. The cleaning operation may performed for a sufficient time to return the pressure differential across the filter device to an acceptable predetermined level.

In some embodiments, a single integrated controller may monitor the pressure differential across each of the filter devices and be operable to control the flush valves and initiate cleaning operations for each of the filter devices. In such embodiments, the controller may be operable to coordinate the cleaning operations of individual filters. The integrated controller may also be operable to monitor and operate other aspects of the filtering system, including the intake pump, the first and second control valves, the outlet valves of each filter device, the injection valves for the chemical injection system, and the output valves for controlling flow to the one or more emission devices. The integrated controller may also be operable to monitor and control multiple functions in the filtering system, such as:

a. coordinating cleaning operations of the filter devices in order to prevent or reduce instances in which the filter devices reach a threshold pressure differential simultaneously;

b. monitoring chemical conditions of the filtrate, and signaling the chemical injection system to add chemical agents into the filtrate as determined by pre-determined requirements for use of the filtrate;

c. controlling the volume and flow rate of filtrate delivered to one or more allocations of the filtrate (e.g., through an emission device to a crop field, to a drinking water storage tank, etc.);

d. coordinating the delivery of filtrate to multiple allocations according to pre-determined requirements and parameters (e.g., providing a first pre-determined volume of filtrate to a first field at a pre-determined time, and a providing a second pre-determined volume of filtrate to a second field at a pre-determined time);

e. adjusting the flow rate of the intake pump according to one or more pre-determined factors, including current filtrate production needs, the volume of the effluent source from which the effluent is drawn, the pressure required by the filter devices to maintain sufficient filtration rates, particulate content of the effluent, and other appropriate factors;

f. operating the outlet valves of each of the filter devices to adjust pressures in the filter devices upstream and/or downstream of the outlet valve;

g. adjusting the operation of the filtering system based on available power from a solar energy source, or maintaining operation only during off-peak electrical grid use periods;

h. collecting and storing data regarding the time and volume of filtrate production, the amount and time of filtrate supply to one or more allocations of filtrate, chemical characteristics of the filtrate, the amount of electrical energy used to produce the filtrate, the volume of effluent flushed by each filter device, the time required to sufficiently clean the filter element of each filter device, and other data regarding the operation of the filtering system; and i. sending data and receiving programming from a remote computer with which the integrated controller is in electronic communication, allowing a remote operator to monitor the operation of the filtering system and alter the parameters and settings of the integrated controller, such as the threshold pressure differentials of the filter devices, a pH threshold, the amount of a fertilizer composition injected into the filtrate, and other settings.

For example, and without limitation, an integrated controller may control the flush valves and cleaning operations of the filtering devices, and the variable frequency drive controller for the intake pump and/or inlet valve for the intake pump. In such integrated controller systems, the controller may be programmed to include protocols for maximizing the efficiency of the filtering system. The controller may be programmed to adjust the flow rate and operation of the filtering system based on one or more factors. In some implementations, the filtering system may slow or stop the drive pump in response to a decrease in the surface level of the settling pond, since the reduction in surface level below a certain point may indicate that the particulate and solid concentration in the effluent may be too high to be filtered effectively (it may cause excessive clogging). The filtering system may include a float sensor that is calibrated to be triggered and send a signal to the controller when the surface level falls below a pre-determined threshold level. In some implementations, the controller may increase the flow rate generated by the intake pump during a cleaning operation of one or more of the filter devices in order to maintain the water pressure within the filtering system during the cleaning operation. In further implementations, the filtering system may slow or stop the intake pump in response to an increase in particulate and solid concentration in the effluent. The filtering system may include a liquid particle counter sensor submerged in the settling pond that is calibrated to be triggered and send a signal to the controller when the particulate level rises above a pre-determined threshold level.

In some embodiment, the controller may regulate the activity of the drive pump to adjust the volume and rate of irrigation water needed for one or more crop fields irrigated by the filtrate. In some implementations, the controller may be programed to irrigate a single field at night, and accordingly the controller activates the filtering drive pump at night and supplies irrigation water to the field. In other implementations, the controller may be programed to irrigation multiple fields at different times, and in some such implementations the fields may have different filtrate volumes and flow rate requirements. The controller in such implementations may cycle between irrigation sessions for each of the multiple fields and control the operation of the drive pump to adjust the volume and rate of effluent pumped into the filtration system as the controller switches between irrigation sessions for separate fields. In such implementations, the filtering system may include a manifold connected to outlet pipes feeding each of the multiple fields, with each outlet including a feeder valve controlling the flow of water into the field. The feeder valves may be in electronic communication with the controller and the controller may control the opening and closing of the feeder valves, opening them according to an irrigation schedule or algorithm (e.g., the controller may provide a first volume of filtrate to a first field, the controller may subsequently provide a second volume of filtrate to a second field, and so on).

As a further example, and without limitation, the controller may be programmed to frequently or continuously monitor the pressure differential across each of the filter devices and coordinate cleaning operations of the filter devices such that only one filter device is undergoing a cleaning operation at any given time. In such examples, the controller may initiate cleaning operations in one of the filter devices prior to the filter device reaching the predetermined condition in order to avoid two filter devices undergoing a cleaning operation at the same time. For instance, if the predetermined condition is a pressure differential of 5 PSI, and the pressure differential across a first filter device is 4 PSI and the pressure differential across a second filter device is 3 PSI, the controller may initiate the cleaning operation in the first filter device to avoid the second filter device from reaching the 5 PSI pressure differential before a cleaning operation for the first filter device is completed. The controller may be programmed, for example, to initiate a cleaning operation in a filter device having a differential pressure closest to the predetermined threshold if there are two or more filter devices that are within a second predetermined value (e.g., in a range of about 1.5 PSI to about 2.5 PSI) from the predetermined threshold pressure differential. The cleaning operation scheme described above is exemplary and not limiting, and other predetermined values and coordination schemes for cleaning operations of the filtering devices are contemplated within scope of the invention.

In some embodiments, the integrated controller operation may be coordinated with other systems to increase efficiencies of a broader operation (e.g., a farm or ranch). For example, the controller may be in electronic communication with a solar energy source and the controller may be programed to wait until the power available to the filtering system rises above a certain level before the controller sends a signal to drive pump to initiate and pump water through the filtering system.

Figure 5:
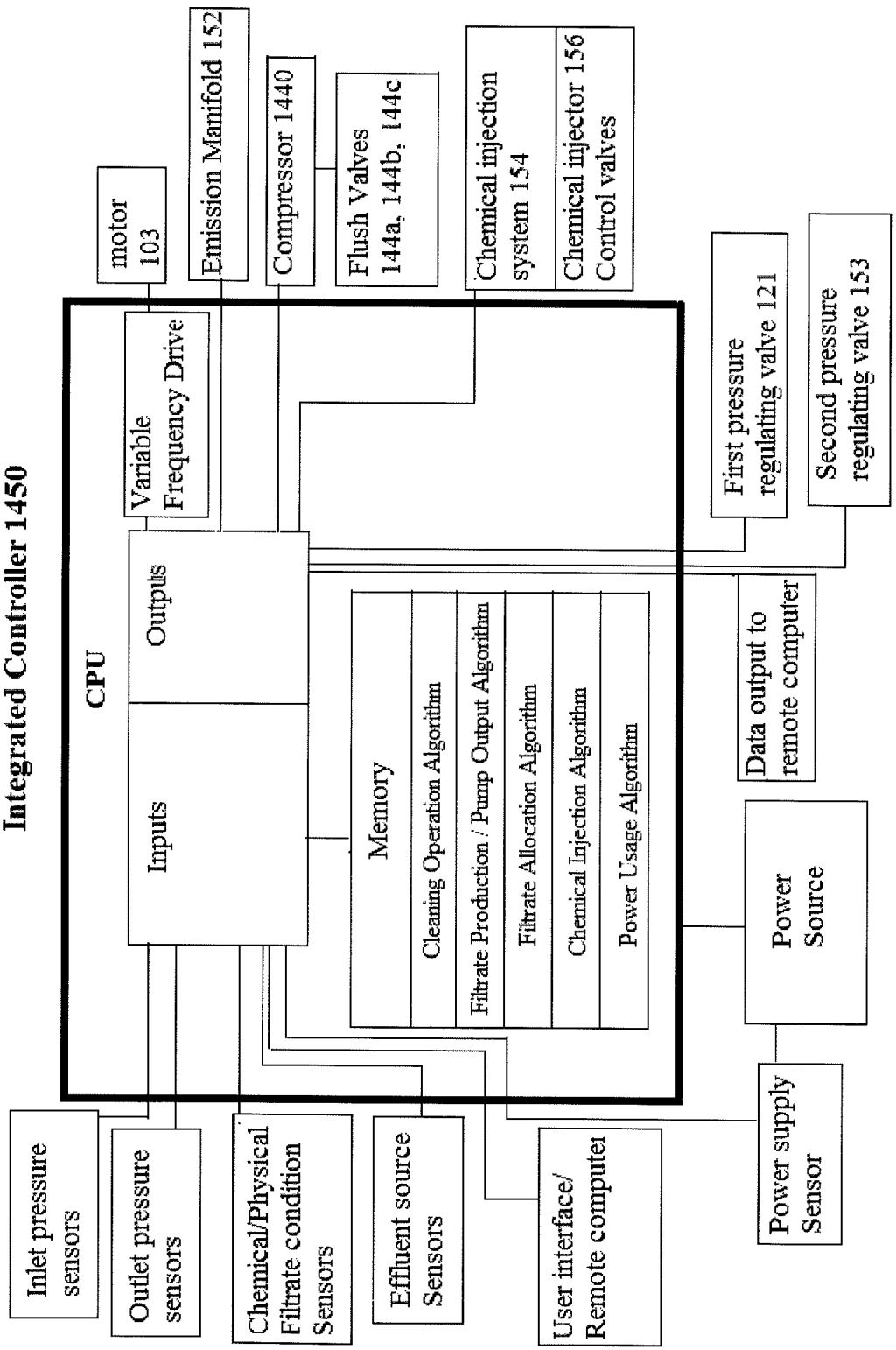
FIG. 5 shows a layout of the major elements of an integrated controller of a filtering system according to an embodiment of the present invention.

FIG. 5 provides a map view of an integrated controller 1450 according to an embodiment of the present invention. The integrated controller 1450 preferably includes a microprocessor that is in electronic communication with the various sensors and valves of the filtration system. As shown in FIG. 5, the integrated controller may be in electronic communication with the sensor and valve elements of the filtering system 100, as described above. The integrated controller 1450 may be operable to receive data from the sensor elements of the filtering system, such as pressure sensors located at the inlets of each filter device, pressure sensors at the outlet of each filter device, chemical and physical sensors that detect conditions of the effluent and filtrate such as pH, salinity, temperature, and other characteristics, and effluent source characteristic sensors, such as volume, solute concentration, temperature, and other sensors. The integrated controller 1450 may analyze the data provided from the sensor elements, comparing the data from the sensor elements with pre-programmed value ranges and threshold values stored in a memory (e.g., in a lookup table) of said integrated controller 1450, and record the data received from the sensor elements and the data analysis of the sensor data in a memory of the integrated controller 1450. The integrated controller may also be programmed to analyze the sensor data, and activate valve elements in the filtering system according to the one or more algorithms (e.g., a cleaning operation algorithm, a filtrate production/ pump output algorithm, a filtrate allocation algorithm, a chemical injection algorithm, and a power usage algorithm), as described herein.

Embodiments of the integrated controller 1450 may also comprise a user interface or may be connected to a remote computer for programming the integrated controller 1450, and an integrated CPU operable monitor the water pressure at the water inlets 132*a*, 132*b*, and 132*c*, the water outlets 133*a*, 133*b*, and 133*c*, and in the intake pipe 120 and the outlet pipe 150. The integrated CPU 146 may thus be operable to compare water pressure at the water inlet 132 and the water outlet 133 of each of the filter devices of the plurality of filter devices 130 and may be operable to open the flush valve 144 of any or all filter devices wherein the difference between the pressure at the water inlet 132 and the water outlet 133 reaches the threshold value (e.g., 5 PSI).

In some embodiments, the integrated controller 1450 may be in electronic communication with the first pressure regulating valve 121 and the second pressure regulating valve 153. The integrated flush controller 145 may be operable to adjust the position of at least one of the first pressure regulating valve 121 and the second pressure regulating valve 153 based on the water pressure at the water inlet 132 of the first filter device 130*a*, or the water pressure at the water outlet 133*c* of the final filter device 130*c*, or both.

In some embodiments, a pump power controller 110 and a variable frequency drive controller 111 may be integrated into the integrated controller 1450. In some embodiments, the variable frequency drive controller 111 may be independent of the flush controller and operable to receive a signal from a water pressure sensor 147 upstream of the first filter device 130*a* and vary the speed of the centrifugal pump 103 to increase or decrease water pressure at the outlet 105 of the intake pump 101 based on the signal.

The integrated controller 1450 may be in electronic communication with the chemical injection system 154 for injecting measured amounts of chemicals into the filtrate to regulate the level of one or more chemical conditions according to a pre-determined level or range of acceptable levels. For example, the integrated controller 1450 may operate the chemical injection system 154 to regulate the pH level of the filtrate that is introduced into an irrigation system. Other beneficial chemical agents may be added into the filtrate as well, such as an anti-microbial agents, herbicides, pesticides, fertilizers, etc. The chemical injection system may include a motor controlled by the integrated controller 1450, and injection devices 156 for selectively adding a beneficial chemical agent into the filtrate.

The integrated controller 1450 may control the operation of the flush valves 144*a*, 144*b*, and 144*c*, which may be air pressure-actuated diaphragm valves. The flush valves 144*a*, 144*b*, and 144*c* may be in air pressure communication with an associated air compressor 1440, which may be under the control of the integrated controller 1450 through electronic communication. The integrated controller may be in electronic communication with both the compressor motor and a valve positioner for each of the valves 144*a*, 144*b*, and 144*c*. The valve positioners regulate the flow of compressed air to the associated diaphragm valve, allowing a single compressor to provide the air to the plurality of diaphragm valves 144*a*, 144*b*, and 144*c*.

The integrated controller 1450 may be in electronic communication with the various sensor and valve elements of the filtration system as described herein, and may control the operation of the various valve elements based on the sensor data provided to the integrated controller 1450 and the algorithms programmed therein, as described herein.

CONCLUSION/SUMMARY

The present invention provides methods for filtering effluent water for use in drip irrigation. It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:

1. A method for filtering effluent water, comprising the steps of:
    a. providing an intake pump operable to draw effluent water from an agricultural effluent source, and drawing said effluent from the effluent source and pumping the effluent into an intake;
    b. providing a plurality of self-cleaning filter devices arranged in sequence with progressively finer filter elements, and passing said effluent from said intake sequentially through said plurality of filter devices to filter out particulates to produce a filtrate for delivery to an emission device;
    c. delivering a filtrate produced by said plurality of filter devices to a pre-determined filtrate allocation; and
    d. performing a self-cleaning operation in each individual filter device of said plurality of filter devices independently of other filter devices of said plurality of filter devices, wherein said self-cleaning operation is initiated by a sensed condition within a respective individual filter device and said plurality of filter devices continue filtering said effluent and producing said filtrate during said self-cleaning operation for delivery to said emission device.

2. The method of claim 1, wherein said intake pump is in fluid communication with an intake pipeline for connecting said intake pump to said plurality of filter devices, and said intake pipeline comprises a first pressure regulating valve operable to adjust a flow rate of said effluent water through said intake pipeline to compensate for a pressure drop during activation of said self-cleaning operation.

3. The method of claim 1, further comprising providing pressure sensors at an effluent inlet and an effluent outlet of at least one of said plurality of filter devices, and providing a controller in electronic communication with said pressure sensors.

4. The method of claim 3, wherein said self-cleaning operation is initiated by said controller when said controller detects that a pressure differential between said effluent inlet and said effluent outlet is greater than or equal to a pre-determined threshold value stored in a memory of said controller.

5. The method of claim 1, further comprising providing a plurality of flush valves, each flush valve being in fluid communication with one of said plurality of filter devices, wherein each of said plurality of flush valves comprises an air actuated diaphragm valve.

6. The method of claim 5, wherein each of said plurality of flush valves is controlled by an independent flush controller, said independent flush controller being operable to open at least one of said plurality of flush valves to initiate a cleaning operation when said independent flush controller detects a fluid pressure differential between an effluent inlet and an effluent outlet of a corresponding one of said plurality of filter devices is greater than or equal to a pre-determined threshold value.

7. The method of claim 6, wherein said independent flush controller is operable to close said at least one of said plurality of flush valves when said independent flush controller detects that said fluid pressure differential between said effluent inlet and said effluent outlet falls below said pre-determined threshold, or after a predetermined time.

8. The method of claim 6, wherein pressure sensors are located at said effluent inlet and said effluent outlet of said one of said plurality of filter devices, and said independent controller is in electronic communication with said pressure sensors.

9. The method of claim 5, further comprising providing an integrated controller, said integrated controller being operable to open at least one of said plurality of flush valves to initiate a cleaning operation when a fluid pressure differential between an effluent inlet and an effluent outlet of said individual filter device of said plurality of filter devices becomes greater than or equal to a pre-determined threshold value, wherein pressure sensors are located at said effluent inlet and said effluent outlet of said individual filter device of said plurality of filter devices, and said integrated controller is in electronic communication with said pressure sensors.

10. The method of claim 9, wherein said integrated controller is operable to close said flush valve when said fluid pressure differential falls below said pre-determined threshold value, or after a predetermined time.

11. The method of claim 1, further comprising the step of injecting a chemical into said effluent water, wherein said chemical comprises at least one of a fertilizer, an antimicrobial agent, and a pH regulating agent.

12. The method of claim 1, further comprising adjusting a flow rate of said intake pump in order to compensate for a pressure drop of said effluent in said plurality of filter devices during said self-cleaning operation.

13. The method of claim 1, wherein said self-cleaning operation includes moving a moveable suction device that removes material from an interior surface of a filter screen in said individual filter device.

14. A method for filtering organic solids and debris from an effluent water for reclaimed use, comprising the steps of:
 a. pumping said effluent water from an effluent source via an intake pump system;
 b. filtering said effluent water sequentially through a series of interconnected filter devices with progressively finer filter elements, each of said filter devices having a self-cleaning system controlled by a flush valve in fluid communication with said filter device;
 c. monitoring fluid pressure differentials across each of said filter devices, wherein at least one controller receives pressure differential data from sensors in said series of interconnected filter devices and said at least one controller is operable to activate said self-cleaning system of each individual filter device of said series of filter devices independently by opening a corresponding flush valve when said pressure differential data reaches a threshold pressure differential across the individual filter device;
 d. delivering a filtrate from said series of filter devices to an emission device, said emission device being operable to provide said filtrate to a pre-determined site; and
 e. opening said corresponding flush valve, wherein said effluent continues to sequentially pass through said series of interconnected filter devices, said series of filter devices continue to filter said effluent water, and said filtrate is delivered to said emission device while said corresponding flush valve is open.

15. The method of claim 14, wherein at least one controller includes an independent flush controller for each one of said series of filter devices, said independent flush controller being in electronic communication with the corresponding flush valve for said individual filter device of said series of filter devices.

16. The method of claim 14, wherein said intake pump system is in fluid communication with an intake pipeline for connecting said intake pump system to said series of filter devices, and said intake pipeline comprises a first pressure regulating valve operable to adjust a flow rate of said effluent water through said intake pipeline to compensate for a pressure drop during activation of said self-cleaning system.

17. The method of claim 16, wherein said first pressure regulating valve comprises an electronic actuator in electronic communication with said at least one controller, said electronic actuator being operable to receive a signal from said at least one controller and adjust a position of said first pressure regulating valve based on said signal.

18. The method of claim 14, wherein said sensors include pressure sensors at an effluent inlet and an effluent outlet of each individual filter device of said series of filter devices, and said at least one controller is in electronic communication with said pressure sensors.

19. The method of claim 18, wherein opening said corresponding flush valve is initiated by said at least one controller when said at least one controller detects that a fluid pressure differential between said effluent inlet and effluent outlet of said individual filter device is greater than or equal to a pre-determined threshold value stored in a memory of said at least one controller.

20. The method of claim 18, wherein said flush valve comprises an air actuated diaphragm valve.

21. The method of claim 18, wherein said at least one controller is operable to close said corresponding flush valve when a fluid pressure differential between said effluent inlet and said effluent outlet of said individual filter device of said series of filter devices falls below said pre-determined threshold, or after a predetermined time.

22. The method of claim 14, further comprising the step of injecting a chemical into said effluent water, wherein said chemical comprises at least one of a fertilizer, an antimicrobial agent, and a pH regulating agent.

23. The method of claim 14, wherein a flow rate of said intake pump is adjusted to compensate for a pressure drop of said effluent in said series of interconnected filter devices when said corresponding flush valve is open.

24. The method of claim 14, wherein said self-cleaning system includes a moveable suction device that performs a self-cleaning operation and removes material from an interior surface of a filter screen in each of said filter devices.

25. A filtering system for filtering effluent water, comprising:
 a. an intake pump operable to draw effluent from an effluent source;

b. a plurality of self-cleaning filter devices in fluid communication with said intake pump, said plurality of self-cleaning filter devices being arranged in sequence with progressively finer filter elements such that effluent from said effluent source is passed sequentially through each of said plurality of self-cleaning filter devices continuously during a filtration process without the need to interrupt the filtration process for cleaning said filters, and each of said plurality of self-cleaning filter devices has (i) at least one pressure sensor operable to measure a fluid pressure across the corresponding self-cleaning filter device and (ii) a flush valve in fluid communication with the corresponding self-cleaning filter device; and c. at least one controller operable to open each of said flush valves independently of other flush valves of said plurality of flush valves and in response to a measured fluid pressure in the corresponding self-cleaning filter device, wherein said plurality of self-cleaning filter devices are operable to deliver filtered effluent to an emission device while any of said plurality of flush valves mare open.

26. The system of claim 25, wherein each of said plurality of filter devices is associated with a corresponding independent controller that monitors a pressure drop between an effluent inlet and an effluent outlet of the filter device.

27. The system of claim 26, wherein each of said independent controllers is in electronic communication with the flush valve of the corresponding self-cleaning filter device, and is operable to open the flush valve when said pressure drop becomes greater than or equal to said pre-determined threshold.

28. The system of claim 27, wherein said independent controllers are operable to close the flush valve of the corresponding self-cleaning filter device when the pressure drop between the effluent inlet and the effluent outlet of the corresponding self-cleaning filter device falls below said pre-determined threshold, or after a predetermined time.

29. The system of claim 25, wherein said at least one controller is an integrated controller that individually monitors a pressure drop between the effluent inlet and the effluent outlet of each of said plurality of self-cleaning filter devices.

30. The system of claim 29, wherein the integrated controller is in electronic communication with each of the flush valves and is operable to open each of the flush valves when the pressure drop between the effluent inlet and the effluent outlet of the corresponding filter device becomes greater than or equal to a pre-determined threshold.

31. The system of claim 30, wherein said intake pump is a variable rate pump and said controller is operable to adjust a flow rate of said intake pump, and said flow rate is adjusted to compensate for a pressure drop of said effluent in said plurality of self-cleaning filter devices when a flush valve is open.

32. The system according to claim 25, wherein said at least one pressure sensor of each of said plurality of self-cleaning filter devices comprises a first pressure sensor in proximity to said effluent inlet and a second pressure sensor in proximity to said effluent outlet.

33. The system of claim 25, wherein said flush valves are air actuated diaphragm valves.

34. The system of claim 25, further comprising a chemical injection system for injecting at least one chemical into said effluent or a filtrate of said system.

35. The system of claim 25, wherein said intake pump is part of an intake pump system that includes a self-cleaning filter element for removing coarse solids and particulates from the effluent.

36. The system of claim 25, wherein each of said plurality of self-cleaning filter devices includes a moveable suction device that removes material from an interior surface of a filter screen in said self-cleaning filter device during a self-cleaning operation when a corresponding flush valve is open.

* * * * *